United States Patent
Sampedro-Thompson et al.

(10) Patent No.: US 12,091,155 B2
(45) Date of Patent: Sep. 17, 2024

(54) STRUCTURAL ARRANGEMENT FOR STRUT-BRACED WING ASSEMBLY OF AN AIRCRAFT

(71) Applicant: The Boeing Company, Chicago, IL (US)

(72) Inventors: William Sampedro-Thompson, Mill Creek, WA (US); Ben C. Welte, Edmonds, WA (US); Michael J. Gamble, Redmond, WA (US); Steven F. Hastings, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 198 days.

(21) Appl. No.: 17/661,727

(22) Filed: May 2, 2022

(65) Prior Publication Data
US 2023/0046394 A1    Feb. 16, 2023

Related U.S. Application Data

(60) Provisional application No. 63/202,899, filed on Jun. 29, 2021.

(51) Int. Cl.
*B64C 1/26* (2006.01)

(52) U.S. Cl.
CPC ..................................... *B64C 1/26* (2013.01)

(58) Field of Classification Search
CPC ....... B64C 1/26; B64C 3/14; B64C 2003/149; B64C 3/185; B64C 3/187; B64C 3/26; B64C 3/32; B64C 7/00; B64D 27/18; B64F 5/10
See application file for complete search history.

(56) References Cited

U.S. PATENT DOCUMENTS

| | | | | |
|---|---|---|---|---|
| 1,992,560 | A | * | 2/1935 | Welman ................... B64C 3/00 244/123.8 |
| 4,013,190 | A | * | 3/1977 | Wiggins ................. B64D 37/32 220/88.1 |
| 10,703,457 | B2 | * | 7/2020 | Wright ................... B64D 29/02 |

(Continued)

FOREIGN PATENT DOCUMENTS

| | | | | |
|---|---|---|---|---|
| CA | 3120840 | A1 * | 1/2022 | ............. B64C 3/182 |
| EP | 2551197 | | 1/2013 | |

(Continued)

OTHER PUBLICATIONS

EPO, Extended European Search Report for Appl. No. 22172328.1, issued on Oct. 10, 2022.

*Primary Examiner* — Assres H Woldemaryam

(57) ABSTRACT

An aircraft has a fuselage, a wing assembly, and a pair of struts. The wing assembly has a center wing structure and a pair of outer wing structures. The center wing structure is coupled to the fuselage at a wing-fuselage joint, and has a pair of engine mounting locations respectively on opposite sides of a wing centerline. Each of the struts is coupled to the fuselage at a strut-fuselage joint, and to one of the outer wing structures at a strut-wing joint. Each strut-fuselage joint is located below and aft of the wing-fuselage joint. Each outer wing structure is coupled to the center wing structure at a mid-wing joint located no further inboard than the engine mounting location, and no further outboard than the strut-wing joint.

20 Claims, 15 Drawing Sheets

(56) References Cited

U.S. PATENT DOCUMENTS

| | | | |
|---|---|---|---|
| 10,807,728 B2 * | 10/2020 | Rawdon | B64C 39/10 |
| 10,933,970 B2 | 3/2021 | Harrison | |
| 2003/0222170 A1 | 12/2003 | Wojciechowski | |
| 2004/0118969 A1 * | 6/2004 | MacCready | B64C 39/024 |
| | | | 244/5 |
| 2013/0264428 A1 * | 10/2013 | Rouyre | B64C 37/00 |
| | | | 244/45 R |
| 2015/0136898 A1 * | 5/2015 | McCoy | B64C 3/56 |
| | | | 244/49 |
| 2016/0001874 A1 * | 1/2016 | Pitt | B64C 3/16 |
| | | | 244/99.11 |
| 2018/0086449 A1 * | 3/2018 | Sarigul-Klijn | B64C 31/02 |
| 2019/0300143 A1 * | 10/2019 | Harrison | B64C 3/14 |

FOREIGN PATENT DOCUMENTS

| | | |
|---|---|---|
| EP | 3486171 | 5/2019 |
| EP | 3725671 | 10/2020 |
| EP | 4112447 | 1/2023 |

* cited by examiner

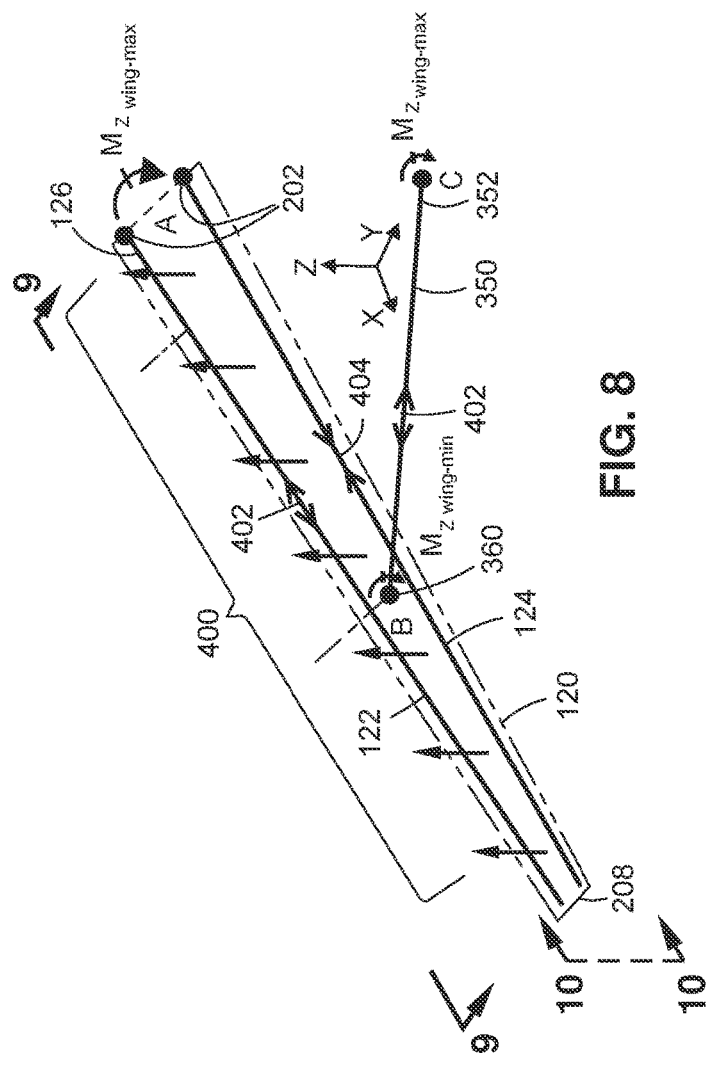
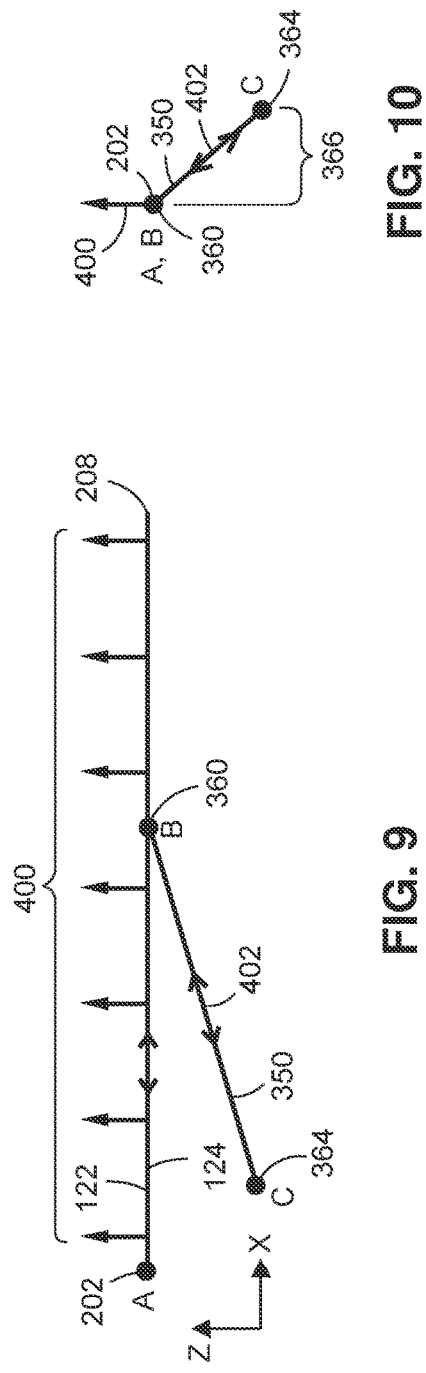
FIG. 8
FIG. 9
FIG. 10

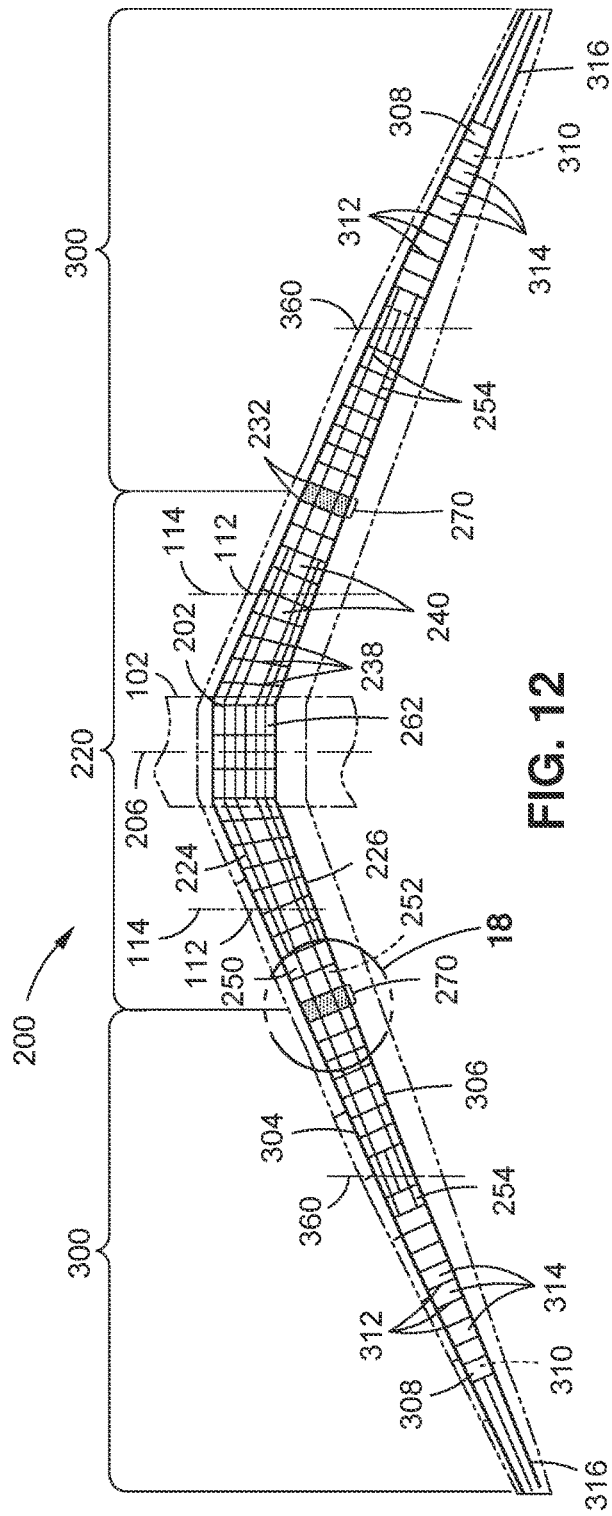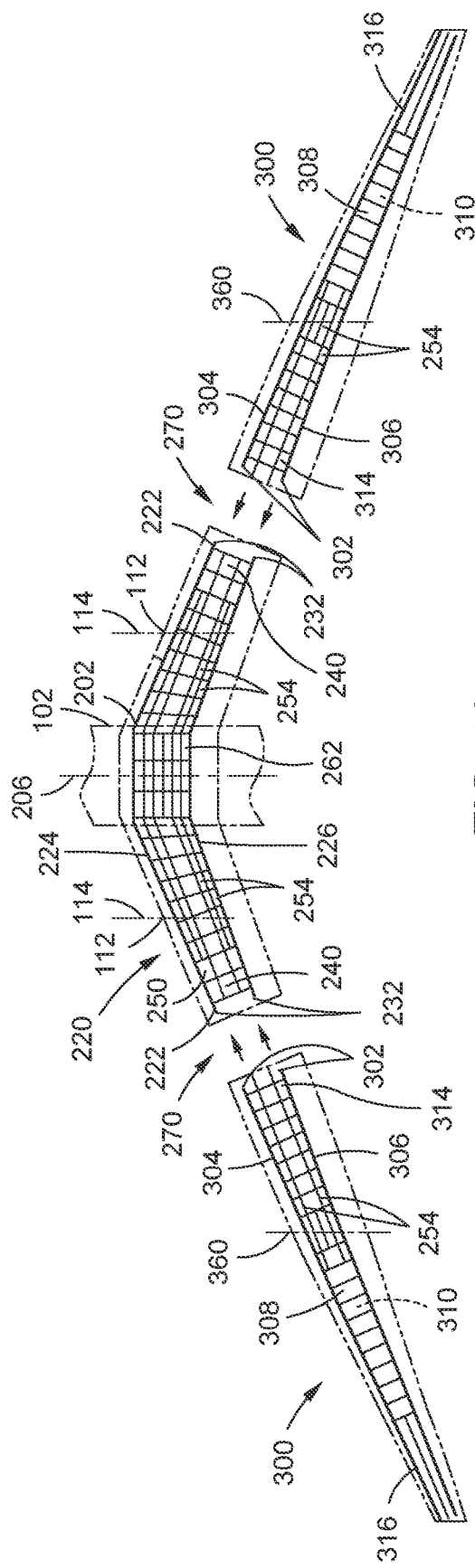

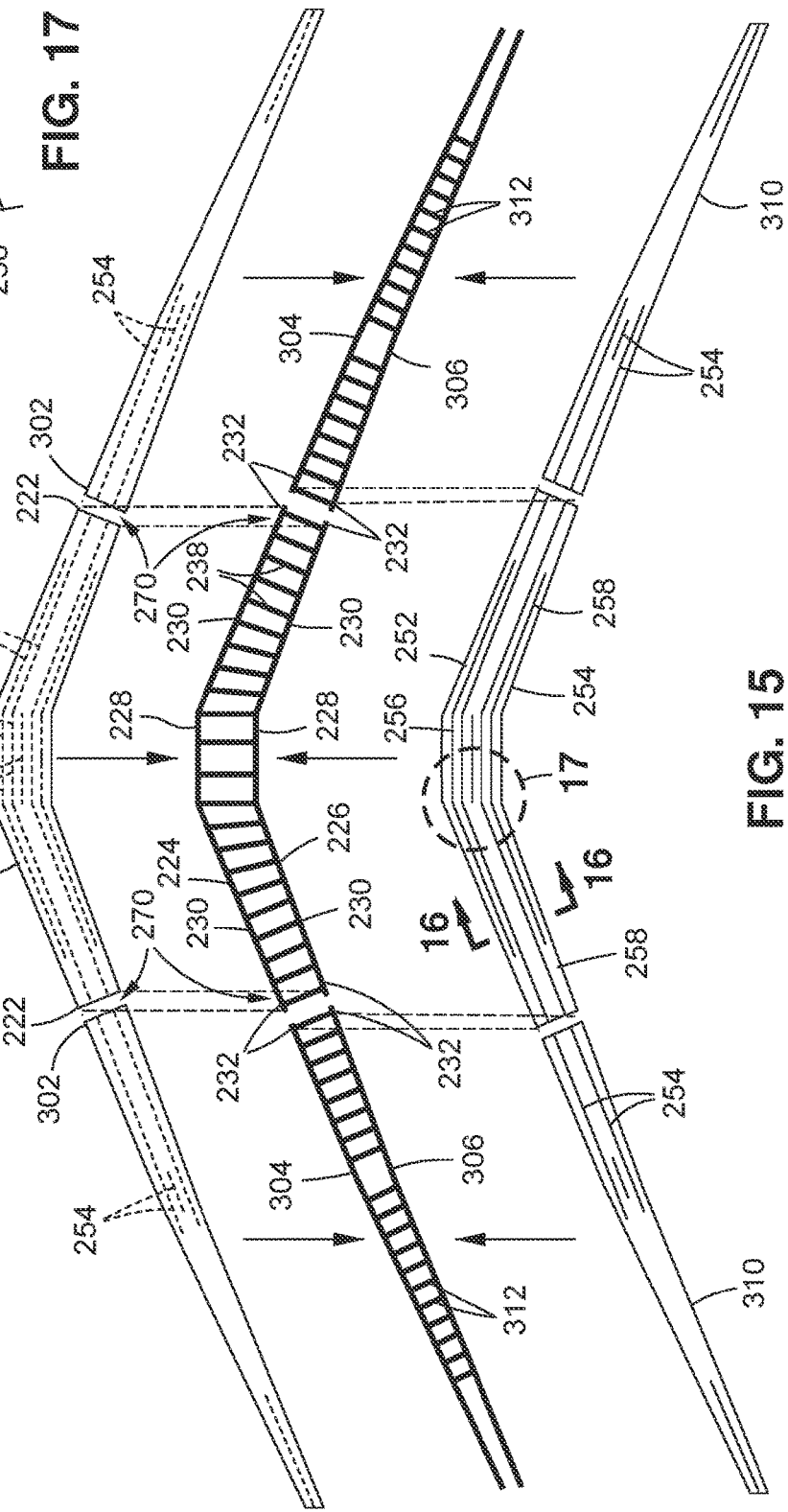

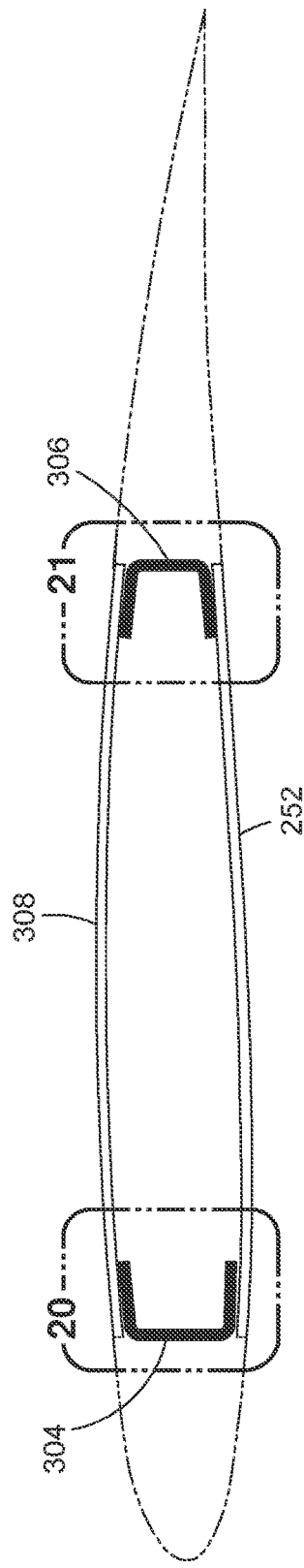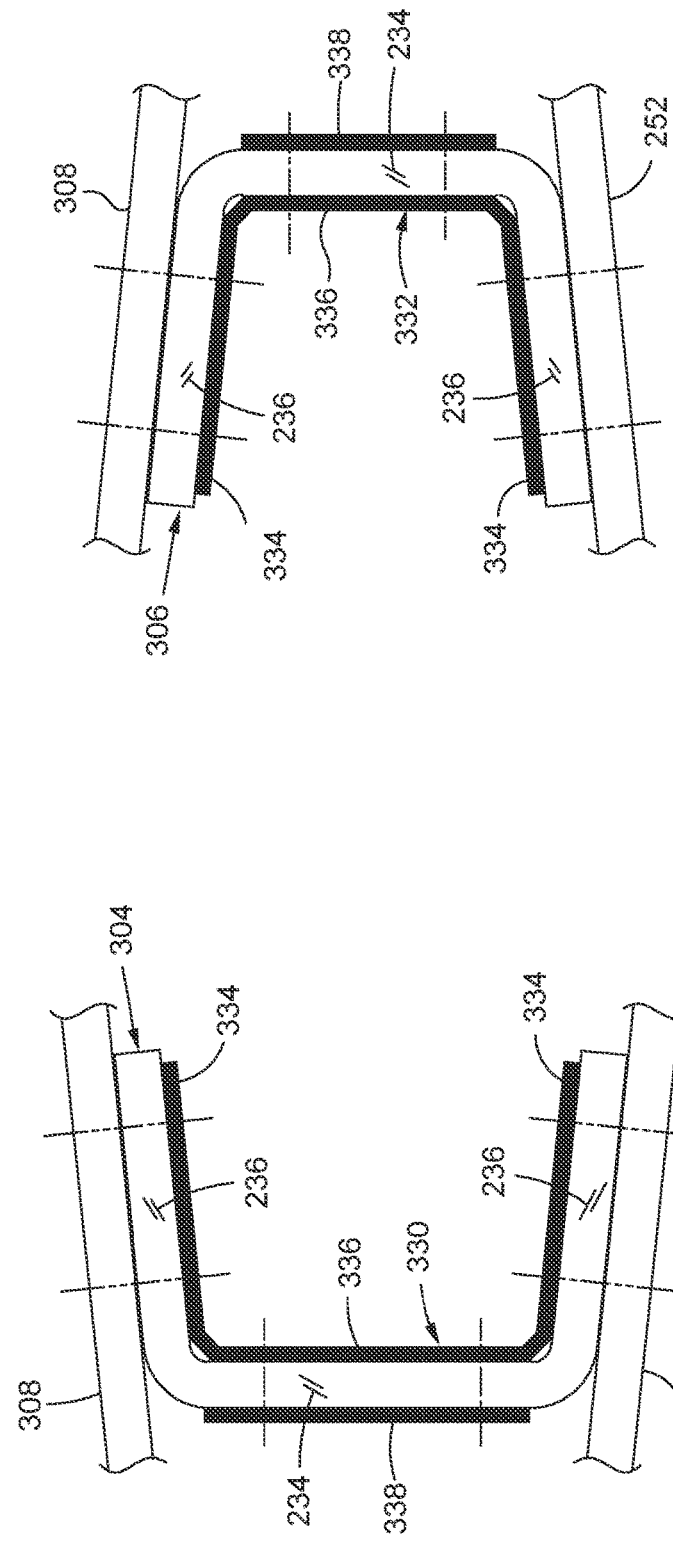

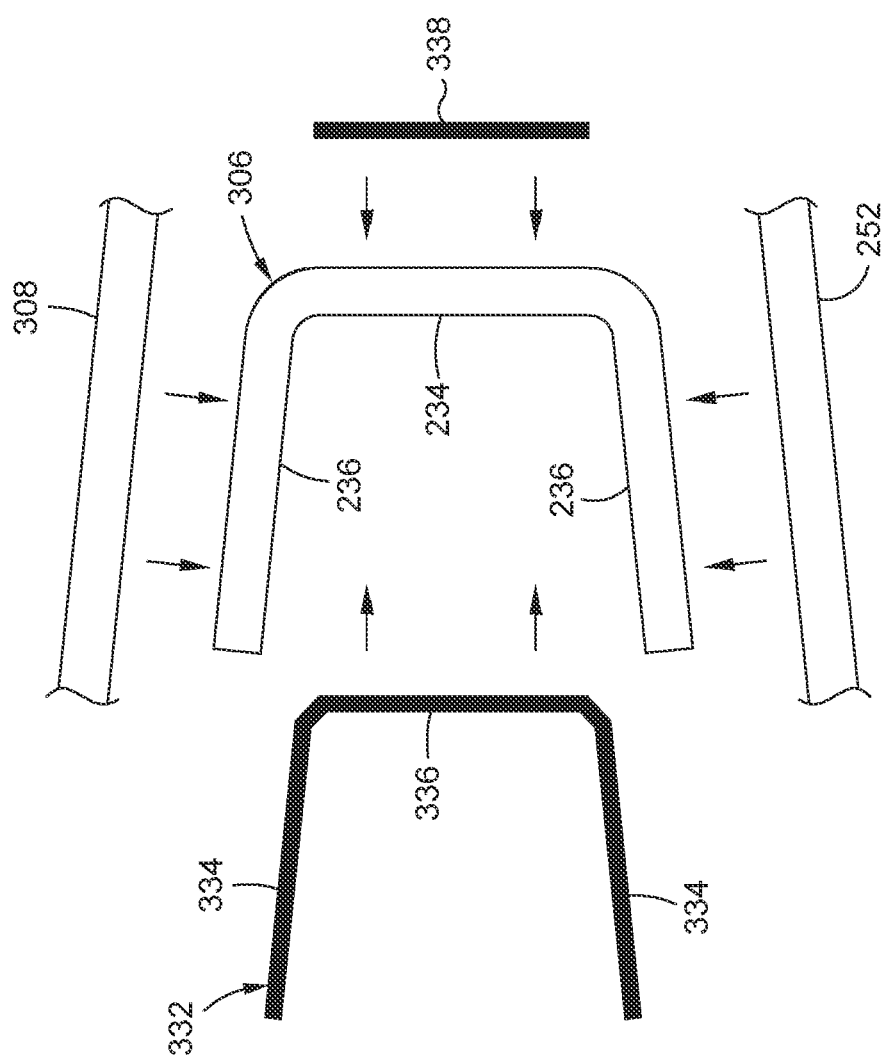

600 — 602: GENERATING A LIFTING FORCE WHEN AIR PASSES OVER A WING ASSEMBLY, THE WING ASSEMBLY COMPRISES:

A CENTER WING STRUCTURE, COUPLED TO THE FUSELAGE AT A WING-FUSELAGE JOINT, AND HAVING A WING CENTERLINE, AND A PAIR OF ENGINE MOUNTING LOCATIONS RESPECTIVELY ON OPPOSITE SIDES OF THE WING CENTERLINE;

A PAIR OF OUTER WING STRUCTURES, COUPLED RESPECTIVELY TO OPPOSITE ENDS OF THE CENTER WING STRUCTURE VIA A PAIR OF MID-WING JOINTS, EACH MID-WING JOINT LOCATED OUTBOARD OF A CORRESPONDING ONE OF THE ENGINE MOUNTING LOCATIONS, THE OUTER WING STRUCTURES ARE RESPECTIVELY SUPPORTED BY A PAIR OF STRUTS, EACH COUPLED TO THE FUSELAGE AT A STRUT-FUSELAGE JOINT, AND COUPLED TO ONE OF THE OUTER WING STRUCTURES AT A STRUT-WING JOINT, EACH STRUT-FUSELAGE JOINT IS LOCATED BELOW AND AFT OF THE WING-FUSELAGE JOINT

604: GENERATING TENSION LOAD IN THE STRUTS DUE TO THE LIFTING FORCE

606: COUNTERACTING, AT EACH MID-WING JOINT, A VERTICAL MOMENT INDUCED BY THE TENSION LOAD IN THE STRUTS

FIG. 26

STRUCTURAL ARRANGEMENT FOR STRUT-BRACED WING ASSEMBLY OF AN AIRCRAFT

CROSS-REFERENCE TO RELATED APPLICATION

This non-provisional application claims priority to pending U.S. Provisional Application Ser. No. 63/202,899, entitled STRUCTURAL ARRANGEMENT FOR STRUT-BRACED WING ASSEMBLY OF AN AIRCRAFT, filed Jun. 29, 2021, and which is incorporated herein by reference in its entirety.

FIELD

The present disclosure relates generally to structural arrangements for aircraft and, more particularly, to a structural arrangement for wings that are supported by struts.

BACKGROUND

The use of struts to support the wings of an aircraft can significantly reduce the spanwise bending moment in the wings. Struts are typically attached to a lower portion of the fuselage, and extend up to the wings at an angle. Aircraft that operate at high cruise speeds typically have swept wings to reduce shock waves and the associated wave drag. The aerodynamic performance of an aircraft can be increased by increasing the aspect ratio of the wings. Notably, the vertical thickness of the airfoil section at the wing root of a high-aspect-ratio, strut-supported wing is typically shallower than the airfoil section at the wing root of a conventional cantilevered wing.

When struts are implemented on a swept-wing aircraft with high-aspect-ratio wings, the strut-fuselage joint where the strut root attaches to the fuselage, is located aft of the wing-fuselage joint where the wing root attaches to the fuselage. As a result of the aft offset of the strut-fuselage joint relative to the wing-fuselage joint, the lower portion of the struts (e.g., proximate the strut root) are non-overlapped by the wings when the aircraft is viewed from above. The non-overlapping relation of the wings and struts reduces interference drag, which significantly improves the aerodynamic performance of the aircraft.

However, the aft offset of the strut-fuselage joint results in a relatively large vertical moment on the wings and struts. More specifically, the lifting force generated by the wings on each side of the aircraft is reacted by tension load in the struts. Due to the aft offset of the strut-fuselage joints, the tension load in the struts induces large vertical bending moments at the wing root and strut root, which urges the wings to pivot in an aft direction. In reaction to the large vertical moment, large axial loads are generated at each wing root. For example, the large vertical moment results in large compression loads in the wing rear spar at the wing root. However, wing spars are typically designed to carry primarily spanwise bending loads and shear loads, and are typically not designed to carry large axial loads. Due to the relatively shallow thickness and relatively short chord of the airfoil section of high-aspect-ratio wings, configuring the wing root to accommodate large axial loads is structurally infeasible.

As can be seen, there exists a need in the art for a structural arrangement for a strut-braced wing that is capable of accommodating vertical moments in a structurally efficient manner.

SUMMARY

The above-noted needs associated with strut-braced wings are addressed by the present disclosure, which provides an aircraft having a fuselage, a wing assembly, and a pair of struts. The wing assembly has a center wing structure and a pair of outer wing structures. The center wing structure is configured to be coupled to the fuselage at a wing-fuselage joint. The center wing structure defines a wing centerline, and has a pair of engine mounting locations respectively on opposite sides of the wing centerline. Each of the struts is configured to be coupled to the fuselage at a strut-fuselage joint, and to one of the outer wing structures at a strut-wing joint. Each strut-fuselage joint is located below and aft of the wing-fuselage joint. Each outer wing structure is configured to be coupled to the center wing structure at a mid-wing joint located no further inboard than the engine mounting location, and no further outboard than the strut-wing joint.

Also disclosed is method of manufacturing an aircraft. The method includes coupling a center wing structure to a fuselage at a wing-fuselage joint. The center wing structure defines a wing centerline, and has a pair of engine mounting locations respectively on opposite sides of the wing centerline. The method also includes coupling a pair of outer wing structures respectively to opposite ends of the center wing structure respectively via a pair of mid-wing joints, each located outboard of a corresponding one of the engine mounting locations. The method additionally includes coupling a pair of struts to the fuselage, and respectively to the pair of outer wing structures, by coupling each strut to the fuselage at a strut-fuselage joint located below and aft of the wing-fuselage joint, and coupling each strut to one of the outer wing structures at a strut-wing joint located outboard of the mid-wing joint.

Additionally, disclosed is a method of enhancing the performance of an aircraft. The method includes generating a lifting force when air passes over a wing assembly. The wing assembly comprises a center wing structure that is coupled to a fuselage at a wing-fuselage joint. The center wing structure defines a wing centerline, and has a pair of engine mounting locations respectively on opposite sides of the wing centerline. The wing assembly also includes a pair of outer wing structures, coupled respectively to opposite ends of the center wing structure via a pair of mid-wing joints. Each mid-wing joint is located outboard of a corresponding one of the engine mounting locations. The outer wing structures are respectively supported by a pair of struts, each coupled to the fuselage at a strut-fuselage joint, and coupled to one of the outer wing structures at a strut-wing joint. Each strut-fuselage joint is located below and aft of the wing-fuselage joint. The method additionally includes generating tension load in the struts due to the lifting force. The method also includes counteracting, at each mid-wing joint, a vertical moment induced by the tension load in the struts.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a schematic diagram of the wing and strut of the aircraft of FIG. 5, showing a vertical moment induced at the wing-fuselage joint and at the strut-fuselage joint;

FIG. 9 is a front view of the schematic diagram of FIG. 8;

FIG. 10 is a side view of the schematic diagram of FIG. 8;

FIG. 12 is a top view of an example of a wing assembly, comprising a center wing structure, and a pair of outer wing structures joined to the center wing structure respectively at a pair of mid-wing joints;

FIG. 13 is an exploded view of the wing assembly of FIG. 12, showing each outer wing structure separated from the center wing structure;

FIG. 15 is an exploded perspective view of an example of the wing assembly of FIGS. 12-13, showing an example of a center wing upper skin panel, a pair of outer wing upper skin panels, a center wing lower skin panel, and a pair of outer wing lower skin panels, and configured to be coupled to the framework of spars and wing ribs of the center wing structure and each outer wing structure;

FIG. 16 is a sectional view taken along line 16-16 of FIG. 15, and illustrating an example of stringers coupled to the center wing lower skin panel;

FIG. 17 is a magnified view of the portion of the lower skin panel identified by reference numeral 17 of FIG. 15, and illustrating an example of stringer splices coupling together segments of the stringers of the center wing lower skin panel;

FIG. 19 is a sectional view taken along line 19-19 of FIG. 18, and showing an example of the front spar and rear spar of the center wing outer wing having a channel-shaped cross-section;

FIG. 20 is a magnified view of the portion of the wing assembly identified by reference numeral 20 of FIG. 19, and showing an example of a front spar splice fitting coupling the center wing front spar to the outer wing front spar;

FIG. 21 is a magnified view of the portion of the wing assembly identified by reference numeral 21 of FIG. 20, and showing an example of a rear spar splice fitting coupling the center wing rear spar to the outer wing rear spar;

FIG. 22 is an exploded view of the rear spar and the rear spar splice fitting of FIG. 21;

FIG. 26 is a flowchart of operations included in a method of enhancing the performance of an aircraft.

DETAILED DESCRIPTION

Figure 4:
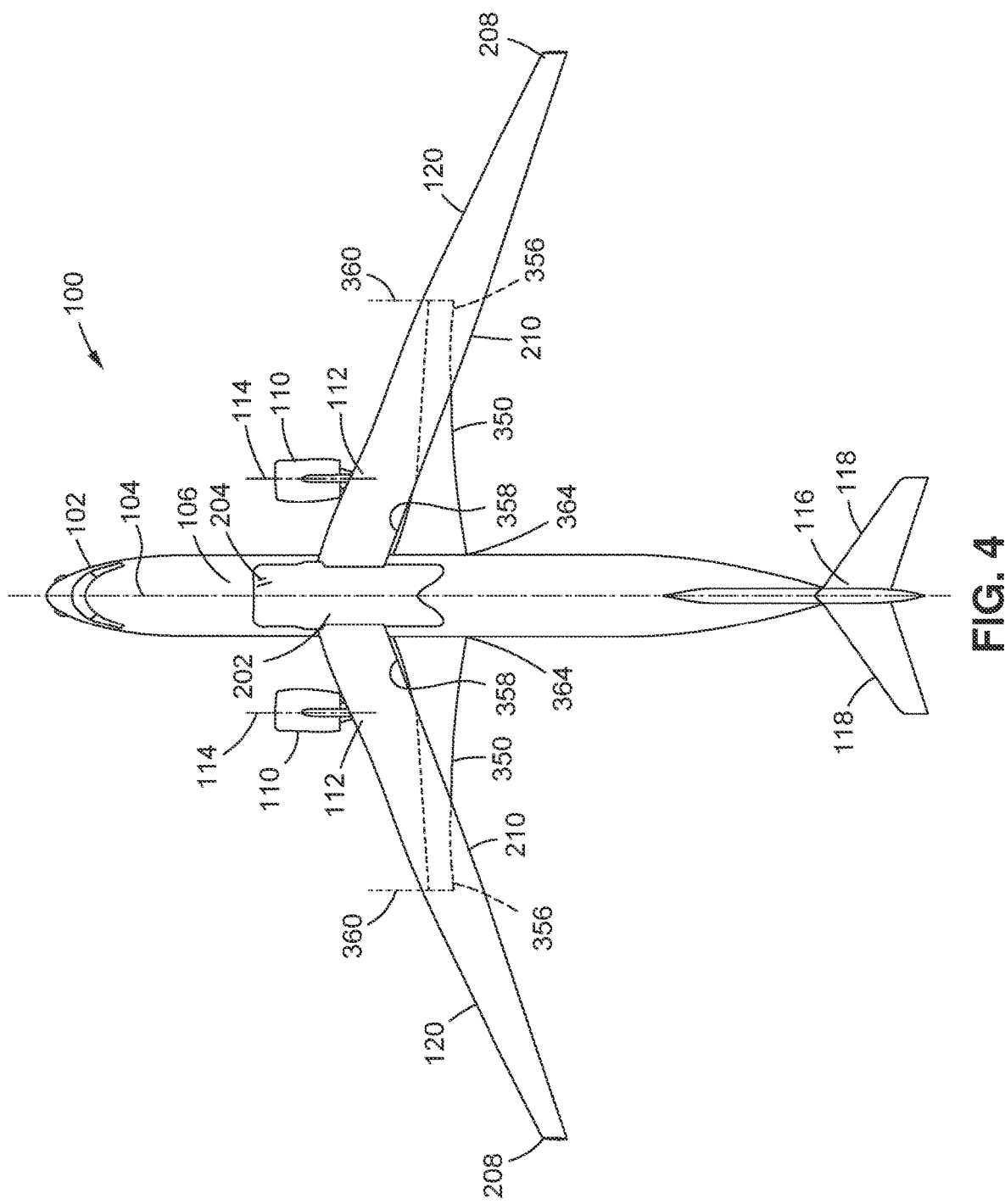
FIG. 4 is a top view of the example of the aircraft of FIG. 1.

Referring now to the drawings which illustrate preferred and various examples of the disclosure, shown in FIGS. 1-4 is an example of an aircraft 100 having wings 120 that are supported by struts 350. In the example shown, the wings 120 are high-aspect-ratio wings, and the wings 120 are swept. The aircraft 100 includes a fuselage 102 defining a longitudinal axis 104 (FIG. 4). The aft end of the fuselage 102 includes a vertical tail 116, and a pair of horizontal tails 118 on opposite sides of the vertical tail 116. The wings 120 are joined to a fuselage upper portion 106 at a wing-fuselage joint 202. In the example shown, the wing-fuselage joint 202 is covered by a wing-fuselage fairing 204. The aircraft 100 includes a pair of engines 110 which, in the example shown, are suspended from the wings 120 respectively on opposite sides of the fuselage 102.

Figure 2:
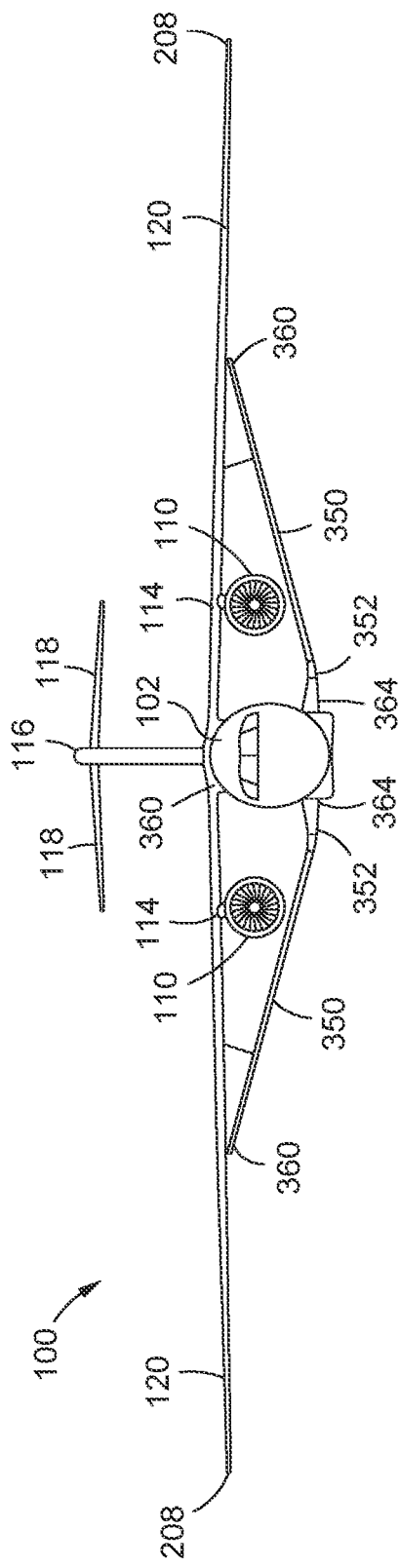
FIG. 2 is a front view of the example of the aircraft of FIG. 1.
Figure 3:
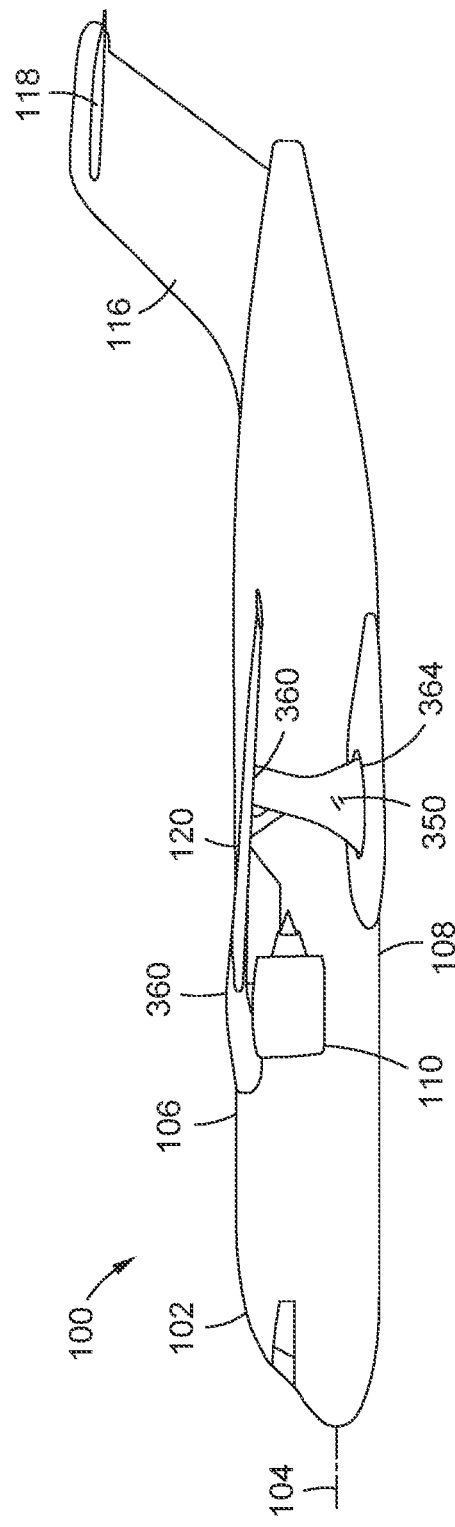
FIG. 3 is a side view of the example of the aircraft of FIG. 1.

Each strut 350 has a strut root 352 and a strut outboard end 356. The strut outboard end 356 of each strut 350 is coupled to one of the wings 120 at a strut-wing joint 360 (FIG. 2). In the example shown, each strut-wing joint 360 is located at a distance of 40-70 percent of the wing halfspan, which is measured in a perpendicular direction from the longitudinal axis 104 to the wingtip 208. However, the strut-wing joint 360 may be located at any location along the wing assembly 200, and is not limited to being located at 40-70 percent of the wing halfspan. The strut root 352 of each strut 350 is coupled to the fuselage lower portion 108 at a strut-fuselage joint 364. In the example shown, each strut-fuselage joint 364 is covered by a strut root fairing 354. Each strut-fuselage joint 364 is located below and aft of the wing-fuselage joint 202.

As a result of the aft offset 366 (FIG. 7) of the strut-fuselage joint 364, at least a portion of each strut 350 is non-overlapped by the wing 120. In this regard, the strut 350 is configured (e.g., oriented and shaped) such that when the aircraft 100 is viewed from a top-down perspective as shown in FIG. 4, at least a portion of the strut leading edge 358 is aft of the wing trailing edge 210. As mentioned above, the non-overlapping relation of the wings 120 and struts 350 reduces interference drag, which significantly improves the aerodynamic performance of the aircraft 100, relative to an aircraft in which the entire length of the struts is overlapped by the wings.

Figure 5:
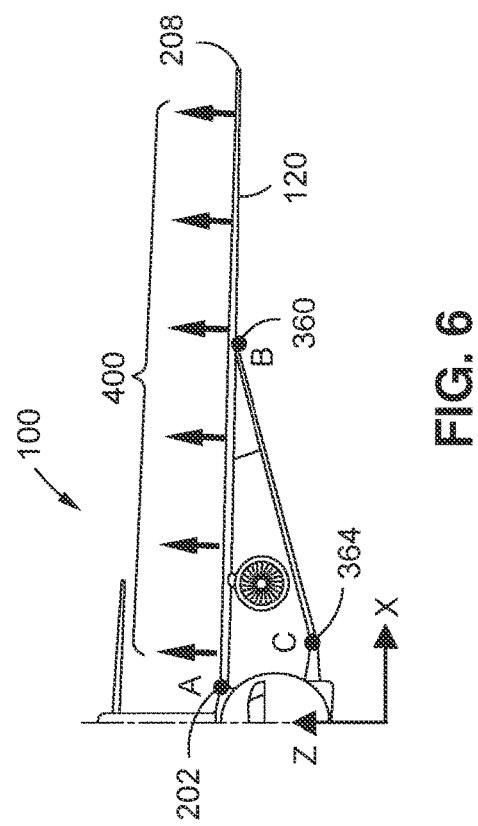
FIG. 5 is a perspective view of the aircraft of FIG. 1, illustrating a lifting force generated along the length of one of the wings.
Figure 6:
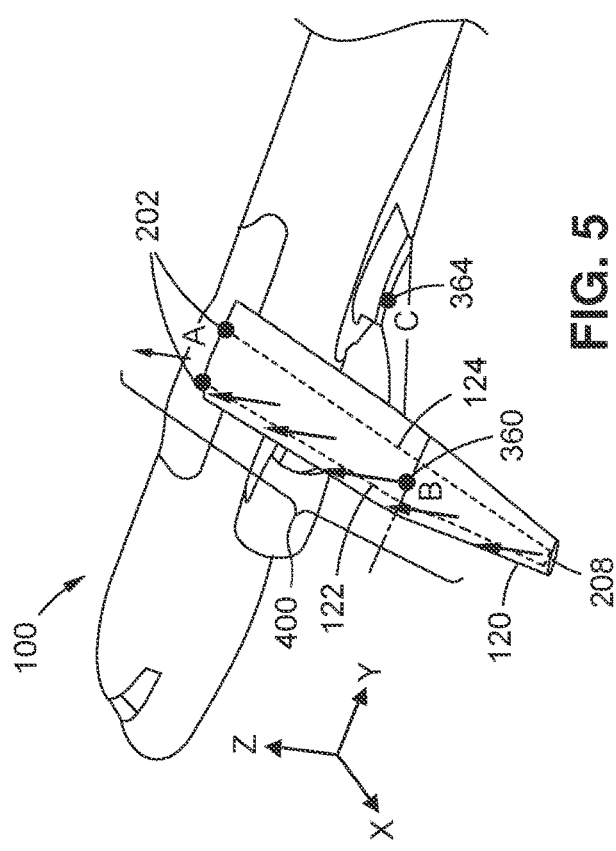
FIG. 6 is a front view of the aircraft of FIG. 5, showing the lifting force, and showing a strut-fuselage joint, identified by reference character C, located below and aft of the wing-fuselage joint, identified by reference character A.
Figure 7:
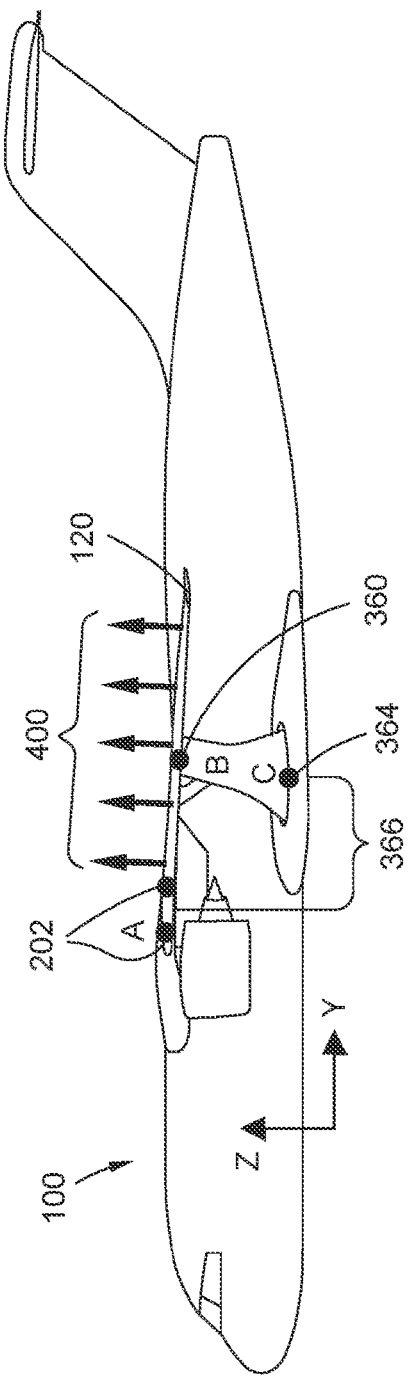
FIG. 7 is a side view of the aircraft of FIG. 5, showing the location of the strut-fuselage joint aft of the wing-fuselage joint.

Referring to FIGS. 5-7, shown respectively are perspective, front, and side views of a portion of the example of the aircraft 100 of FIGS. 1-4. Shown in each figure is the wing-fuselage joint 202, identified by reference character A, the strut-wing joint 360, identified by reference character B, and the strut-fuselage joint 364, identified by reference character C. FIG. 5 shows an example of the wing 120, which has a continuous front spar 122 and a continuous rear spar 124, each extending from the wing-fuselage joint 202 to the wingtip 208. The figures show a lifting force 400 that is generated when air passes over the wing 120. FIG. 7 shows the aft offset 366 of the strut-fuselage joint 364, relative to the wing-fuselage joint 202.

Referring to FIGS. 8-10, shown are schematic diagrams corresponding respectively to FIGS. 5-7. FIGS. 8-10 show examples of the loads on the wing 120 and strut 350 as a result of the lifting force 400. In this regard, FIG. 8 schematically shows the continuous front spar 122 and the continuous rear spar 124 extending from the wing-fuselage joint 202 to the wingtip 208. As mentioned above, the lifting force 400 on the wing 120 generates tension load 402 in the strut 350. Due to the aft offset 366 (FIG. 10) of the strut-fuselage joint 364 relative to the wing-fuselage joint 202, the tension load 402 in the strut 350 induces a vertical bending moment ($M_{z\ wing-max}$) at the wing root 126 and a vertical bending moment ($M_{z\ strut-max}$) at the strut root 352. The vertical moment $M_z$ may be described as a moment about a vertical axis, or an axis that is parallel to the z-axis of the reference coordinate system of FIG. 8.

The vertical moment urges the wing 120 to pivot in an aft direction. In the example shown, the large vertical moment (e.g., ($M_{z\ wing-max}$) is reacted by axial loads in the continuous front spar 122 and the continuous rear spar 124. During a positive aircraft maneuver, the axial loads include tension load 402 in the continuous front spar 122, and compression load 404 in the continuous rear spar 124. The vertical moments ($M_{z\ wing-max}$; $M_{z\ strut-max}$) are at a maximum at the wing root 126 and strut root 352. The magnitude of the vertical moment ($M_{z\ strut-max}$) at the strut root 352 is dependent in part upon the stiffness of the strut-wing joint 360. The magnitude of the vertical moment in the wing 120 tapers linearly in an outboard direction, as represented by the reduced vertical moment ($M_{z\ wing-min}$) at the strut-wing joint 360.

Figure 1:
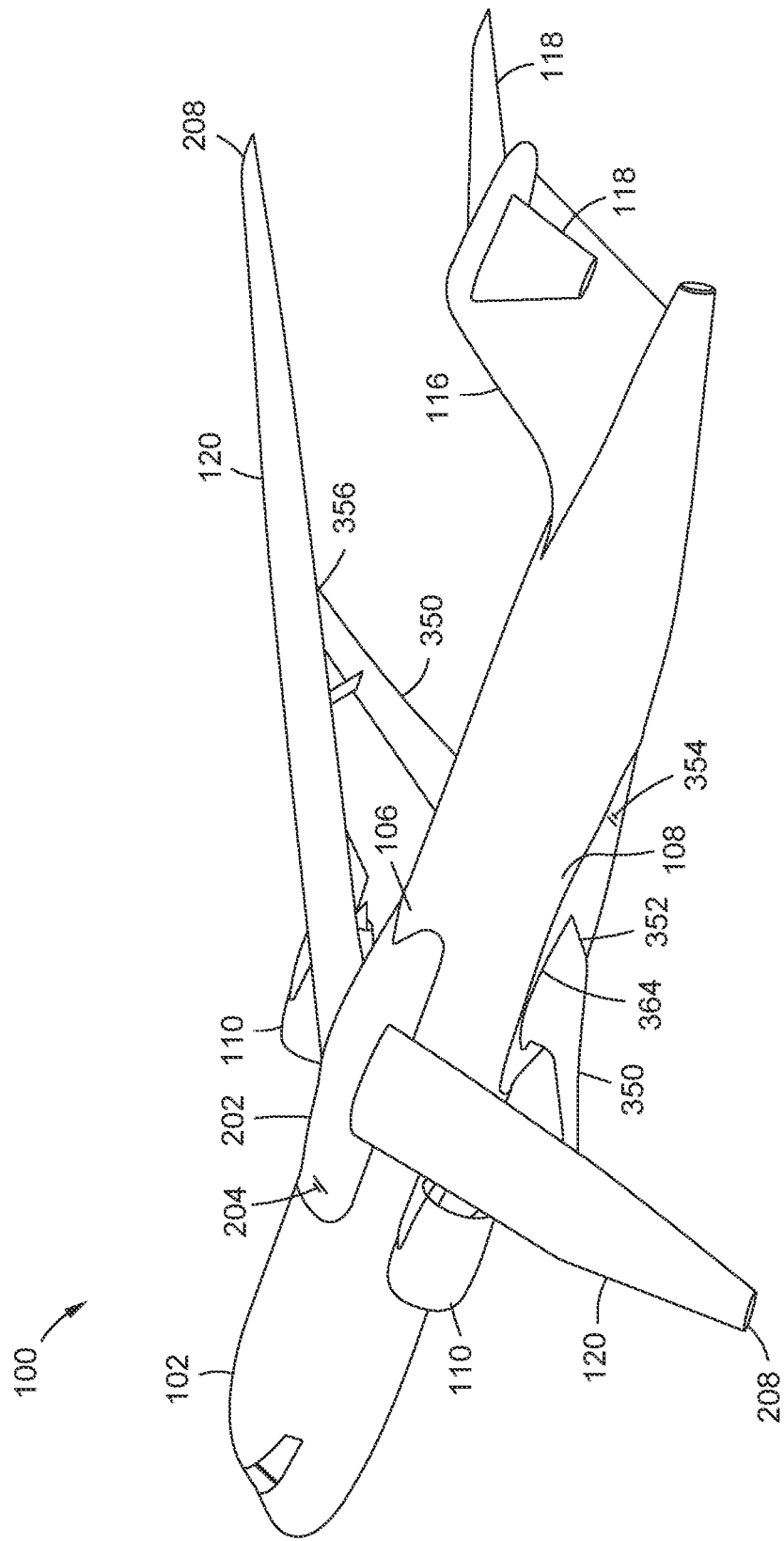
FIG. 1 is a perspective view of an example of an aircraft having wings that are supported by struts.
Figure 11:
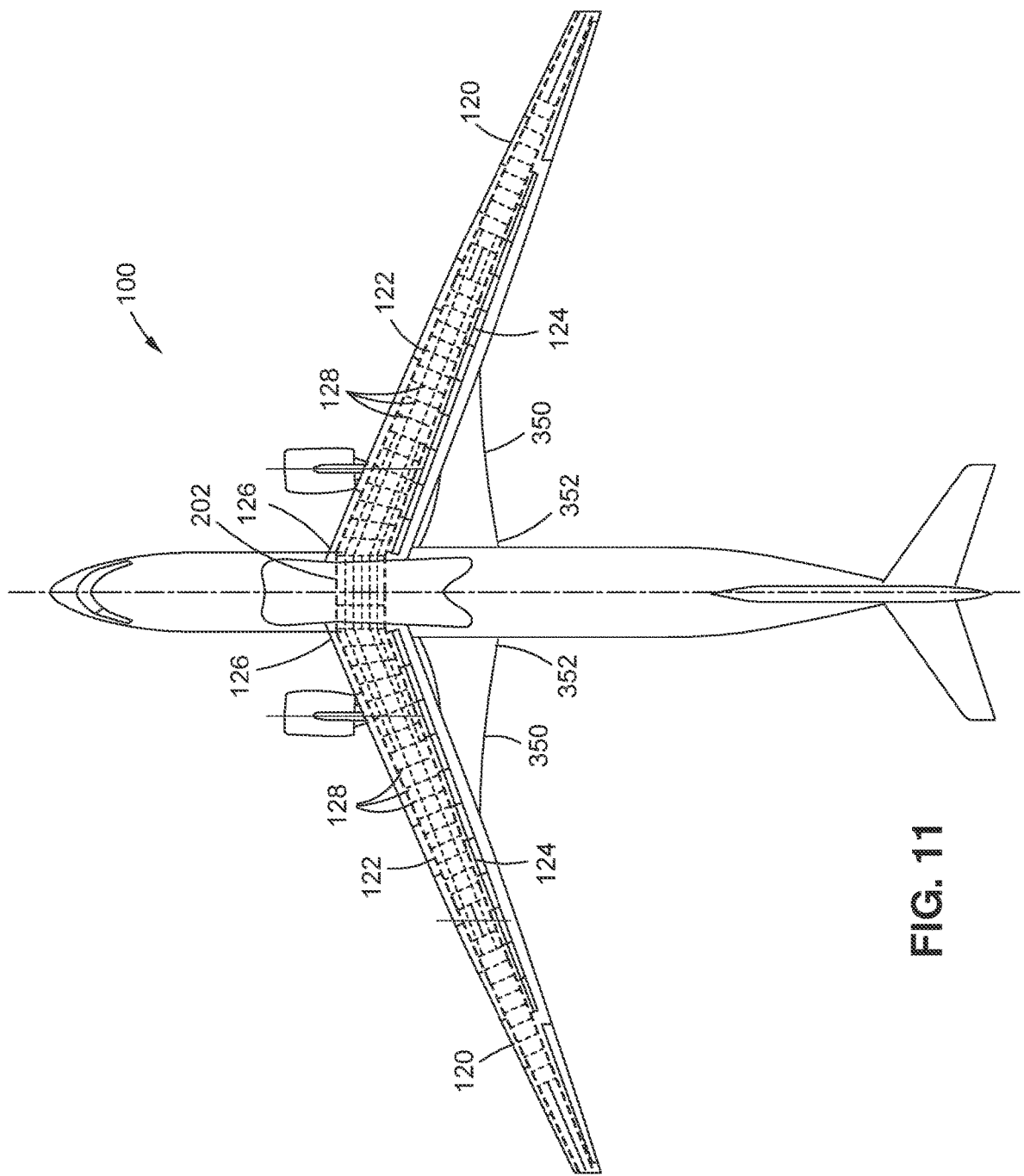
FIG. 11 is a top view of the aircraft of FIG. 1 showing one example of a structural configuration of a pair of wings joined to the fuselage, each wing having a front spar and a rear spar interconnected by a plurality of wing ribs.

Referring to FIG. 11, shown is a top view of the aircraft 100 of FIG. 1, showing one example of a structural configuration of the wings 120 on each side of the aircraft 100. In the example shown, each wing 120 may have a continuous front spar 122, a continuous rear spar 124, and a plurality of wing ribs 128. Although not shown, each wing 120 has one or more upper skin panels and one or more lower skin panels coupled to the continuous front spar 122, the continuous rear spar 124, and the wing ribs 128. For the arrangement shown, the lifting force 400 (FIG. 8) on the wings 120 induces the above-mentioned large vertical moment (e.g., $M_{z\ wing-max}$) at the wing root 126 (and strut root 352), which results in the above-mentioned axial loads in the front spar and the rear spar. Such axial loads are at a maximum at the wing root 126 (e.g., the wing-fuselage joint 202).

Referring now to FIGS. 12-13, shown in FIG. 12 is a top view of an example of a wing assembly 200 of the present disclosure. The wing assembly 200 is made up of a center wing structure 220, and a pair of outer wing structures 300. FIG. 13 is an exploded view of the wing assembly 200, showing each outer wing structure 300 separated from the center wing structure 220. In the example shown, the wing assembly 200 has an aspect ratio (i.e., ratio of wingspan to mean chord) in the range of 10-20, which is approximately twice the aspect ratio of the cantilevered wings of a conventional airliner. As shown in the figures, the center wing structure 220 is configured to be coupled to the fuselage 102 at the wing-fuselage joint 202. The center wing structure 220 defines a wing centerline 206, and has a pair of engine mounting locations 112 respectively on opposite sides of the wing centerline 206. The outer wing structures 300 are configured to be joined to the center wing structure 220 respectively at a pair of mid-wing joints 270.

Notably, each mid-wing joint 270 is located no further inboard than the engine centerline 114 associated with the engine mounting location 112, and no further outboard than the strut-wing joint 360. In one example, the center wing structure 220 is configured such that each mid-wing joint 270 is located at least two feet away from the engine mounting location 112 (e.g., from the engine centerline 114), and/or each mid-wing joint 270 is located at least two feet away from the strut-wing joint 360. For examples where the center wing structure 220 has a plurality of center wing ribs 238 defining a plurality of center wing bays 240, and each outer wing structure 300 has a plurality of outer wing ribs 312 defining a plurality of outer wing bays 314, the wing assembly 200 may be configured such that each mid-wing joint 270 is located at least one center wing bay 240 outboard of the engine mounting location 112, and/or each mid-wing joint 270 is located at least one outer wing bay 314 inboard of the strut-wing joint 360.

Advantageously, locating each mid-wing joint 270 between the engine centerline 114 and the strut-wing joint 360 results in relatively low axial loads at the mid-wing joint 270. The relatively low axial loads at the mid-wing joint 270 (i.e., outboard of the engine 110, and inboard of the strut-wing joint 360) are the result of a reduced spanwise bending moment at locations outboard of the engine 110 of a strut-braced wing, relative to relatively high spanwise bending moments at the same locations (i.e., outboard of the engine) on a cantilevered wing. The reduced spanwise bending moment of a strut-braced wing is a result of the wing assembly 200 and the strut 350 (FIG. 11) each carrying a portion of the spanwise bending moment, in contrast to a cantilevered wing which carries the entire spanwise bending moment.

Referring to FIGS. 12-13 and 15, in the example shown, the center wing structure 220 includes a center wing front spar 224, a center wing rear spar 226, a plurality of center wing ribs 238, a center wing upper skin panel 250, and a center wing lower skin panel 252, the assembly of which defines a center wing box 262. Each outer wing structure 300 includes an outer wing front spar 304, an outer wing rear spar 306, a plurality of outer wing ribs 312, an outer wing upper skin panel 308, and an outer wing lower skin panel 310, the assembly of which defines an outer wing box 316 along at least a portion of each outer wing structure 300. For example, in FIGS. 12-13, the outermost portion of each outer wing structure 300 is comprised of the end portions of the outer wing front and rear spars 304, 306, and a short mid-spar, located between the outer wing front and rear spars 304, 306. However, the wing assembly 200 may be provided in any one of a variety of alternative structural arrangements. For example, the center wing ribs 238 may be omitted from the center wing structure 220 and/or the outer wing ribs 312 may be omitted from the outer wing structures 300, and the center wing structure 220 and/or the outer wing structures 300 may have a multi-spar arrangement (not shown). Furthermore, although FIGS. 12-13 and 15 show the skin panels stiffened by a plurality of stringers 254, the skin panels may be stiffened using alternative methods, such as using strips or planks (not shown) of composite material. In a still further example, the stringers 254 may be omitted from the skin panels of the center wing 220 and/or the outer wing structures 300, and the center wing box 262 and/or each outer wing box 316 may be stiffened by multiple spars (not shown), such as a front spar, a rear spar, and one or more mid-spars located between the front spar and the rear spar.

The center wing front spar 224 and the center wing rear spar 226 each have opposing spar terminal ends 232 respectively at the center wing outboard ends 222. The center wing rear spar 226 is continuous between the spar terminal ends 232. In this regard, the center wing rear spar 226 is formed as a monolithic, one-piece structure extending between the center wing outboard ends 222. Similarly, the center wing front spar 224 may be formed as a monolithic, one-piece structure extending between the center wing outboard ends 222. The center wing front spar 224 and the center wing rear spar 226 may be formed of fiber-reinforced polymer matrix material (i.e., composite material, such as graphite-epoxy). Similar to the center wing front spar 224 and center wing rear spar 226, the center wing upper skin panel 250 and/or the center wing lower skin panel 252 may be formed as a monolithic, one-piece structure extending between the center wing outboard ends 222.

Figure 14:
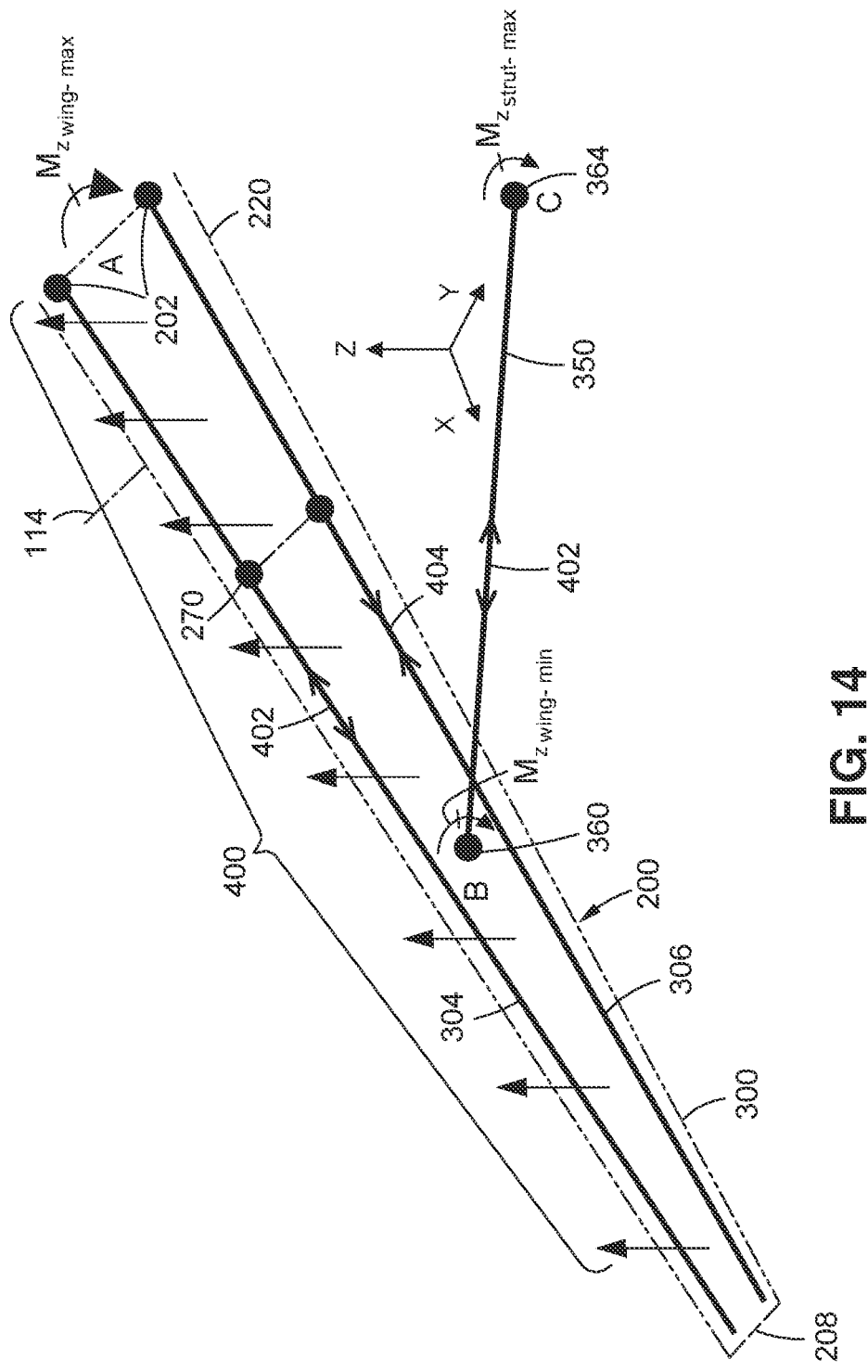
FIG. 14 is a schematic diagram of an outer wing structure and the center wing structure on one side of the wing assembly of FIG. 12, and showing an example of axial loads in the front spar, the rear spar, and the strut, and further showing the vertical moments at the wing-fuselage joint and at the strut-fuselage joint, and a reduced vertical moment at the strut-wing joint.

FIG. 14 is a schematic diagram of an outer wing structure 300 and one-half of the center wing structure 220 of FIG. 12. The schematic diagram shows the lifting force 400 distributed along the lengthwise direction of the wing assembly 200. Also shown is an example of the axial loads in the outer wing front spar 304 (e.g., tension load 402), the outer wing rear spar 306 (e.g., compression load 404), and the strut 350 (e.g., tension load 402), and the vertical moments ($M_{z\ wing-max}$; $M_{z\ strut-max}$) at the wing-fuselage joint 202 and strut-fuselage joint 364. Also shown is the above-mentioned reduced vertical moment ($M_{z\ wing-min}$) at the strut-wing joint 360. Advantageously, by locating the mid-wing joint 270 between the engine centerline 114 and the strut-wing joint 360, the axial loads in the outer wing front spar 304 and the outer wing rear spar 306 are reduced, relative to the axial loads that would otherwise occur if the front spar and rear spar were continuous from the wingtip 208 to the wing-fuselage joint 202.

Referring again to FIGS. 12-13 and 15, the outer wing front spar 304 and the outer wing rear spar 306 of each outer wing structure 300 are configured to be coupled respectively to the center wing front spar 224 and the center wing rear spar 226 at the mid-wing joint 270 associated with the outer wing structure 300. In the example shown, the center wing front spar 224 and the center wing rear spar 226 are each comprised of a center wing spar middle segment 228, and a pair of center wing spar end segments 230 extending respectively from opposite ends of the center wing spar middle segment 228, and terminating respectively at the center wing outboard ends 222. The center wing structure 220 is configured such that when viewed from a top-down perspective, the center wing spar middle segment 228 is perpendicular to the wing centerline 206, and the center wing spar end segments 230 are each oriented at an angle relative to the center wing spar middle segment 228. The center wing middle spar segment and the center wing and spar segments of each of the center wing front spar 224 and center wing rear spar 226 are formed as a continuous, one-piece structure. When the center wing upper skin panel 250 and the center wing lower skin panel 252 are coupled to the center wing front spar 224 and center wing rear spar 226, a continuous, one-piece center wing box 262 (FIGS. 12-13) is formed, extending between the center wing outboard ends 222.

Referring to the example of the wing assembly 200 of FIG. 15, the center wing upper skin panel 250 and the center wing lower skin panel 252 are preferably continuous between the center wing outboard ends 222. The center wing upper skin panel 250 and the center wing lower skin panel 252 may be formed of fiber-reinforced polymer matrix material (i.e., composite material) having at least 3 distinct fiber orientations. For example, the center wing upper skin panel 250 and the center wing lower skin panel 252 may each be manufactured as a laminate of composite plies, including +45-degree plies, −45-degree plies, 90-degree plies, and/or 0-degree plies. However, in other examples, the center wing upper skin panel 250 and/or the center wing lower skin panel 252 may be formed of metallic material, such as aluminum. The outer wing upper skin panel 308 and the outer wing lower skin panel 310 may also each be formed as a continuous member extending from the outer wing inboard end 302 to the wingtip 208. The outer wing upper skin panel 308 and/or the outer wing lower skin panel 310 may be formed of metallic material, or non-metallic material, such as composite material.

Referring to FIGS. 15-17, the center wing upper skin panel 250 and/or the center wing lower skin panel 252 may each include a plurality of integral stringers 254, arranged in chordwise-spaced, approximately parallel relation to each other. FIG. 16 shows an example of stringers 254 coupled to the center wing lower skin panel 252. The center wing upper skin panel 250 may include stringers 254 arranged in a manner similar to the center wing lower skin panel 252. In FIG. 15, the stringers 254 includes a plurality of center section stringers 256 that are generally aligned with the center wing spar middle segment 228. A pair of end section stringers 258 are located on opposite sides of each center section stringer 256. The end section stringers 258 are generally aligned with the center wing spar end segments 230. FIG. 17 shows an example of stringer splices 260 for interconnecting each end section stringer 258 to a center section stringer 256. Although the present example shows the skin panels stiffened by stringers 254, the skin panels may be stiffened using strips, planks, or other stiffening elements. Alternatively, as mentioned above, the center wing box 262 and/or each outer wing box 316 may be stiffened by multiple spars (not shown).

Figure 18:
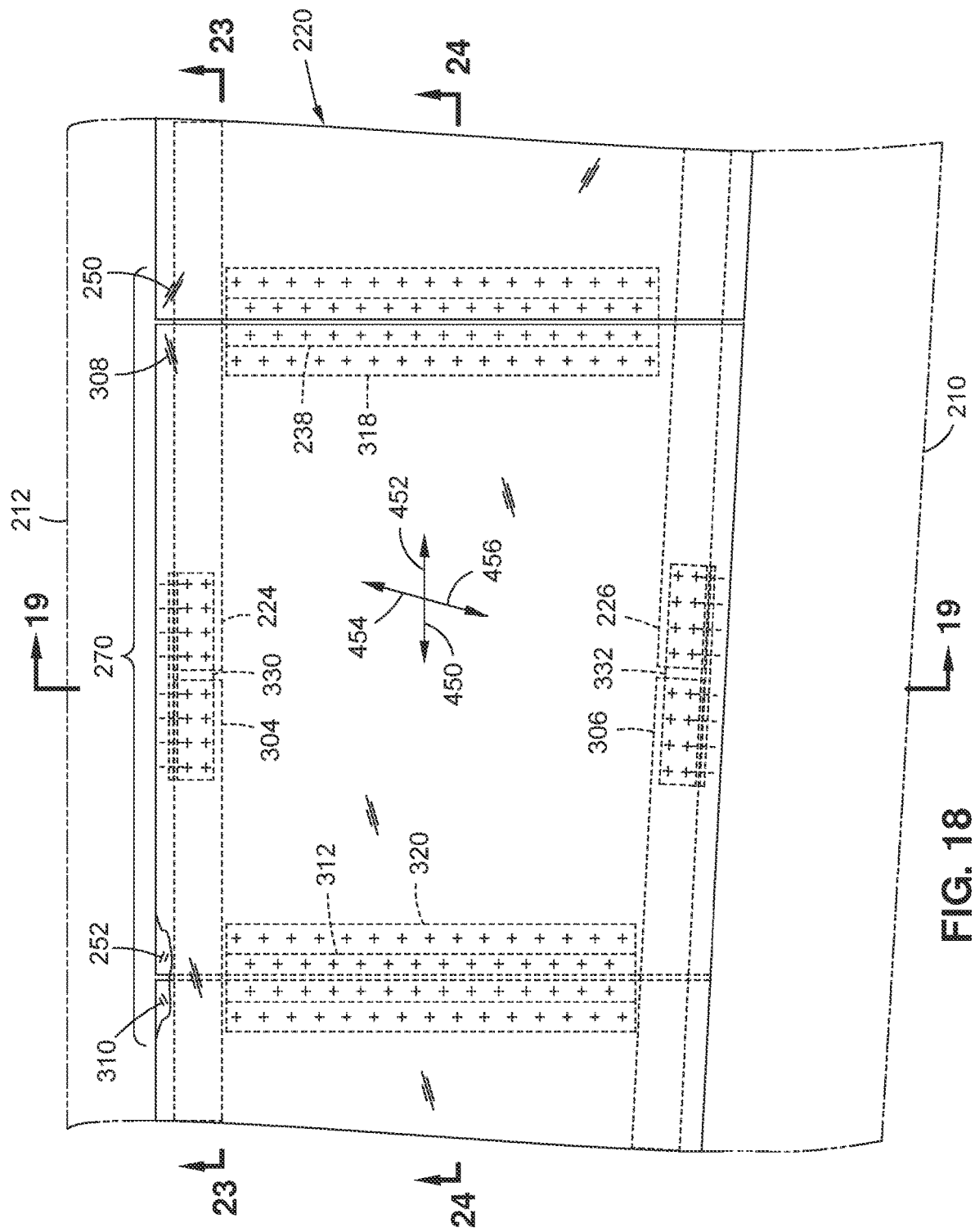
FIG. 18 is a magnified top view of the portion of the wing assembly identified by reference numeral 18 of FIG. 12, and showing an example of mid-wing joint, including a front spar splice fitting coupling the center wing front spar to the outer wing front spar, and a rear spar splice fitting coupling the center wing rear spar to the outer wing rear spar, and also including the center wing upper skin panel and the outer wing upper skin panel spliced together at a center wing rib on one side of the front and rear spar splice fittings, and the center wing lower skin panel and outer wing lower skin panel spliced together at an outer wing rib on an opposite side of the front and rear spar splice fittings.

Referring to FIG. 18, shown is a magnified top view of a portion of the wing assembly 200 (FIG. 12) at a mid-wing joint 270 (FIG. 12). The wing assembly 200 has a wing leading edge 212 and a wing trailing edge 210. For reference, shown is the outboard direction 450, the inboard direction 452, the forward direction 454, and the aft direction 456. FIG. 18 shows a front spar splice fitting 330 coupling the center wing front spar 224 to the outer wing front spar 304, and a rear spar splice fitting 332 coupling the center wing rear spar 226 to the outer wing rear spar 306. In addition, the center wing upper skin panel 250 and the outer wing outer wing upper skin panel 308 are spliced together at a center wing rib 238 of the center wing structure 220, and the center wing lower skin panel 252 (FIG. 24) and the outer wing lower skin panel 310 (FIG. 24) are spliced together at an outer wing rib 312 of the outer wing structure 300.

Figure 23:
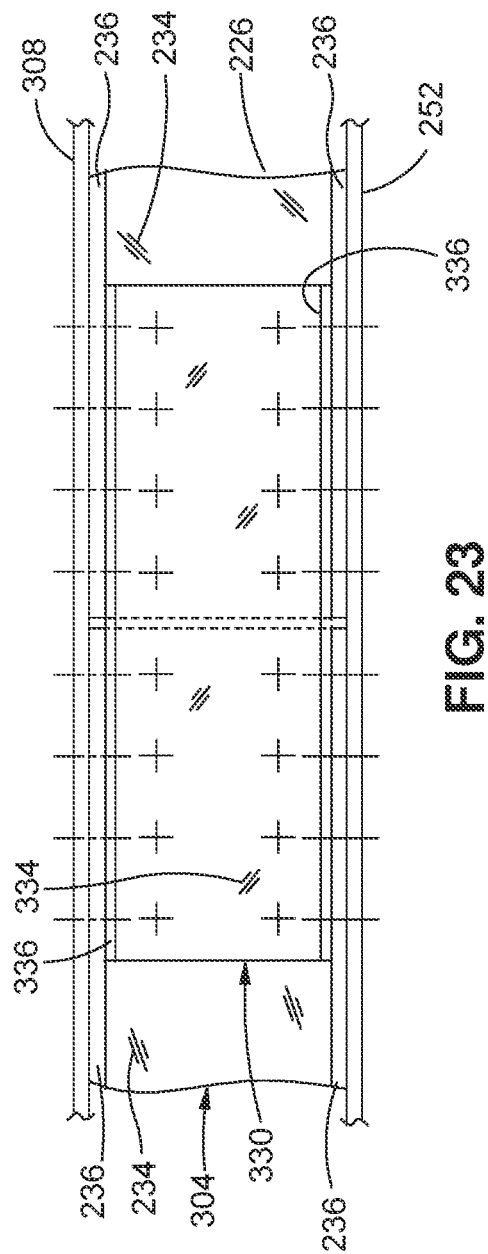
FIG. 23 is a sectional view taken along line 23-23 of FIG. 18, and showing an example of the front spar splice fitting coupling the center wing front spar to the outer wing front spar.

In FIGS. 18 and 23, an upper panel splice plate 318 may be installed at the splice of the center wing upper skin panel 250 and the outer wing upper skin panel 308. A lower panel splice plate 320 may be installed at the splice of the center wing lower skin panel 252 and the outer wing lower skin panel 310. The front spar splice fitting 330 and the rear spar splice fitting 332 are each located between an innermost one of the outer wing ribs 312 where the lower skin panels 252, 310 are spliced together, and an outermost one of the center wing ribs 238 where the upper skin panels 250, 308 are spliced together. However, as mentioned above, the spar splice fittings 330, 332, the upper panel splice plate 318, and the lower panel splice plate 320, may be installed at different spanwise locations, as may be dictated by the load magnitude. For example, if loads at a given spanwise location are relatively low, then the spar splice fittings 330, 332, the upper panel splice plate 318, and the lower panel splice plate 320 may be placed at the same general spanwise location. If loads are relatively high at a spanwise location, then the spar splice fittings 330, 332, the upper panel splice plate 318, and the lower panel splice plate 320 may be spaced apart from each other.

FIG. 19 is a sectional view of a mid-wing joint 270 (FIG. 18), showing an example of the outer wing front spar 304 and the outer wing rear spar 306 at the splices respectively with the center wing front spar 224 (FIG. 18) and the center wing rear spar 226 (FIG. 18). FIG. 20 shows the front spar splice fitting 330 coupling the center wing front spar 224 to the outer wing front spar 304. FIGS. 21-22 show the rear spar splice fitting 332 four coupling the center wing rear spar 226 to the outer wing rear spar 306. In the example of FIG. 18, the front spar and the rear spar of the center wing structure 220 and outer wing structure 300, and the front spar splice fitting 330 and rear spar splice fitting 332, each have a channel-shaped cross section. The channel-shaped cross section of the center wing front spar 224 and outer wing front spar 304 is defined by a spar web 234 interconnecting a pair of spar flange 236.

The channel-shaped cross section of the front spar splice fitting 330 and the rear spar splice fitting 332 is defined by a splice web 334 interconnecting a pair of splice flanges 336. The channel-shaped cross section of the spar splice fittings 330, 332 is configured to nest inside the channel-shaped cross section of the spars 224, 226, 304, 306. Although the figures illustrate the splice fittings 330, 332 as having a channel-shaped cross-section, in other examples not shown, the front spars 224, 304, the rear spars 226, 306, and the splice fittings 330, 332 may have any one of a variety of alternative cross-sectional shapes. Each splice fitting 330, 332 may be formed of metallic material or non-metallic material. For example, each splice fitting 330, 332 may be formed of aluminum, titanium, or other metallic material, and may be mechanically fastened (e.g., using sleeve bolts) to the spars 224, 226, 304, 306. However, in other examples, each splice fitting 330, 332 may be formed of composite material, and may be adhesively bonded to the spars 224, 226, 304, 306.

As shown in FIGS. 20-21 and 23, at each mid-wing joint 270, the splice web 334 is placed in contact with the spar webs 234 of the center wing spar to 224, 226 and outer wing spar 304, 306. A splice backing plate 338 (FIGS. 20-22) is shown positioned on a side of the spar web 234 opposite the splice web 334. Mechanical fasteners are installed through the splice web 334, the spar web 234, and the splice backing plate 338. The splice flanges 336 (upper and lower) of each splice fitting 330, 332 are placed in contact respectively with the spar flanges 236 (upper and lower) of the center wing spar 224, 226 and outer wing spar 304, 306. On the upper side and lower side of each spar 224, 226, 304, 306, mechanical fasteners are installed through the skin panel, the rib flange 242, and the splice flange 336. FIG. 23 shows an example of the front spar splice fitting 330 coupling the center wing front spar 224 to the outer wing front spar 304.

Figure 24:
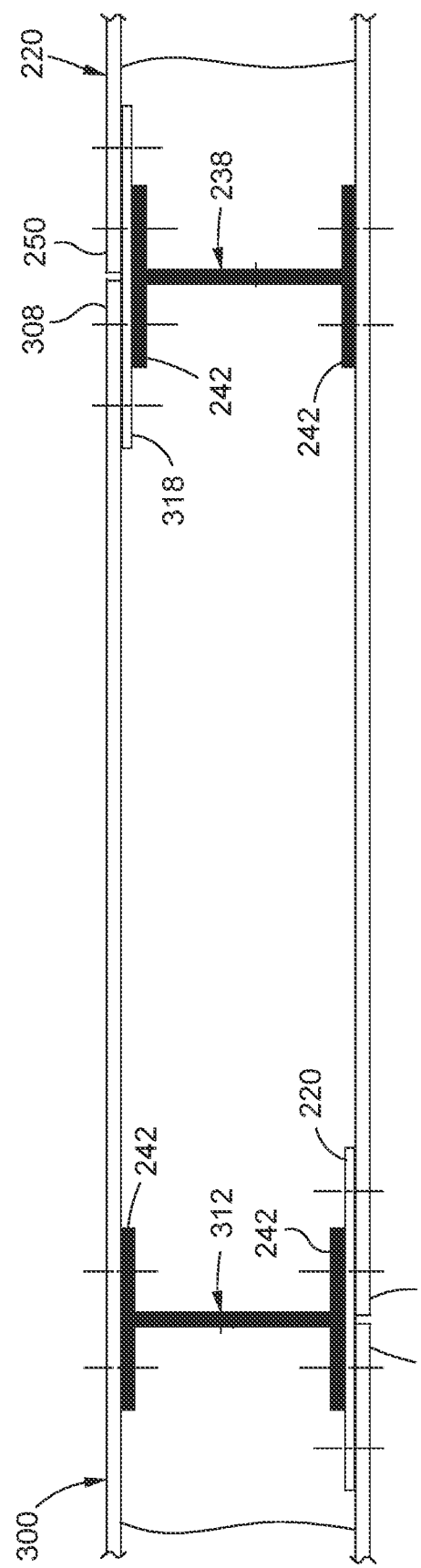
FIG. 24 is a sectional view taken along line 24-24 of FIG. 18, and showing an example of the center wing upper skin panel and the outer wing upper skin panel spliced together via an upper panel splice plate at a center wing rib, and showing an example of the center wing lower skin panel and outer wing lower skin panel spliced together via a lower panel splice plate at an outer wing rib.

FIG. 24 is a sectional view taken along line 24-24 of FIG. 18, and showing an example of the center wing upper skin panel 250 and the outer wing upper skin panel 308 spliced together at a center wing rib 238. Also shown is an example of the center wing lower skin panel 252 and outer wing lower skin panel 310 spliced together at an outer wing rib 312. The wing assembly 200 includes an upper panel splice plate 318 configured to couple the outer wing upper skin panel 308 to the center wing upper skin panel 250, and a lower panel splice plate 320 configured to couple the outer wing lower skin panel 310 to the center wing lower skin panel 252. The upper panel splice plate 318 is mounted on top of a rib flange 242 on an upper side of the center wing rib 238, and the outer wing upper skin panel 308 and the center wing upper skin panel 250 are coupled to the upper panel splice plate 318. The upper panel splice plate 318 is sandwiched between the rib flange 242 on the upper side of the center wing rib 238, and the inner surfaces of the outer wing upper skin panel 308 and the center wing upper skin panel 250. The lower panel splice plate 320 is located on a rib flange 242 on the lower side of the outer wing rib 312, and the outer wing lower skin panel 310 and the center wing lower skin panel 252 are coupled to the lower panel splice plate 320 such that the lower panel splice plate 320 is sandwiched between the lower rib flange 242 of the outer wing rib 312, and the inner surfaces of the outer wing lower skin panel 310 and the center wing lower skin panel 252.

Although FIG. 18 shows the center wing upper skin panel 250 and outer wing upper skin panel 308 spliced together on an inboard side of the spar splice fittings 330, 332 (e.g., inboard of the front spar splice fitting 330), and the center wing lower skin panel 252 and outer wing skin panel spliced together on an outboard side of the spar splice fittings 330, 332, the wing assembly 200 may be configured such that the center wing upper skin panel 250 and outer wing upper skin panel 308 are spliced together on the outboard side of the spar splice fittings 330, 332, and the center wing lower skin panel 252 and outer wing skin panel are spliced together on the inboard side of the spar splice fittings 330, 332. Further in this regard, the center wing upper skin panel 250 and the outer wing upper skin panel 308 may be spliced together at the same spanwise location (e.g., at the same wing rib) as the splice coupling the center wing lower skin panel 252 to the outer wing lower skin panel 310.

Figure 25:
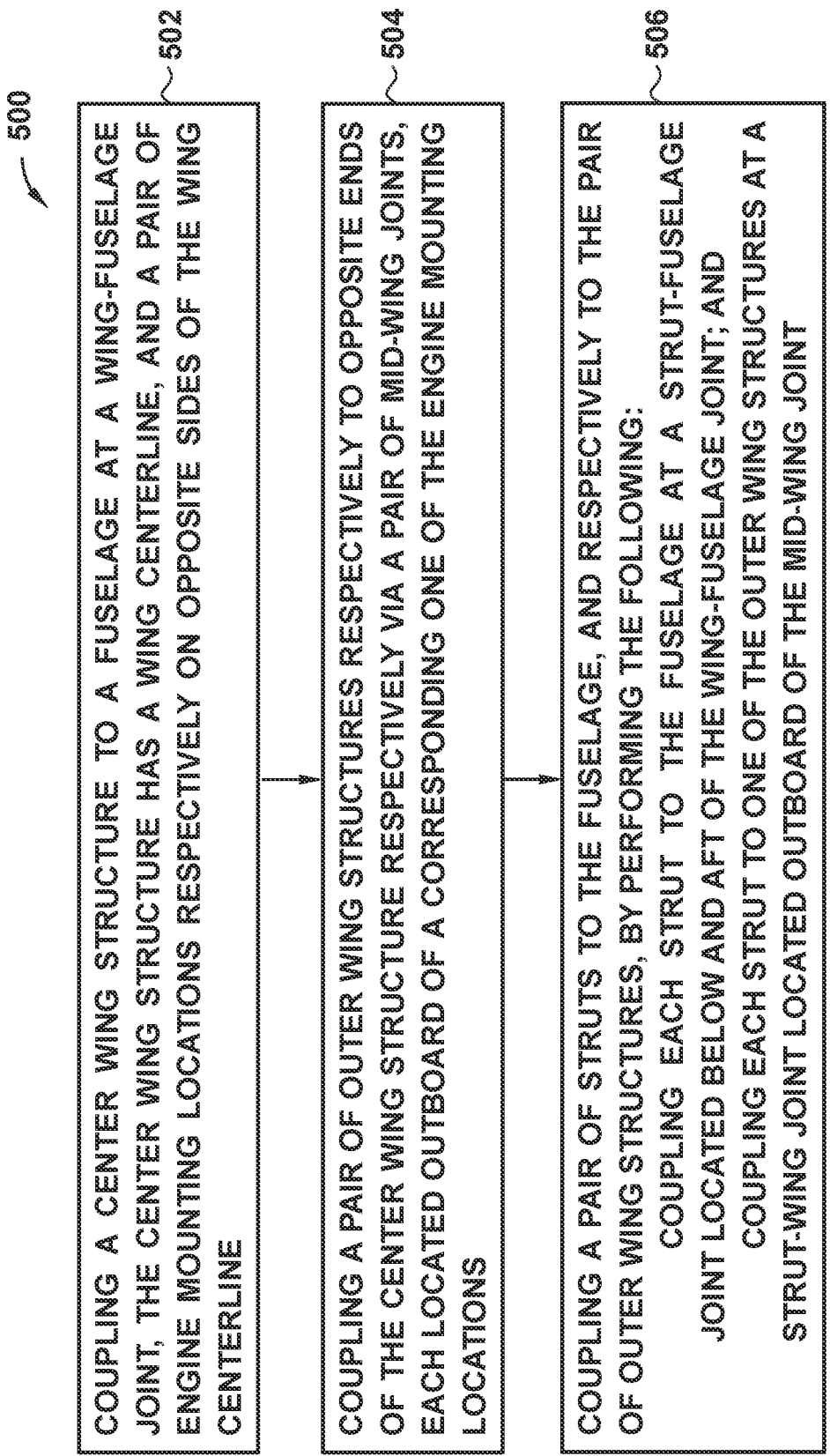
FIG. 25 is a flowchart of operations included in a method of manufacturing an aircraft.

Referring to FIG. 25, shown is a flowchart of operations included in a method 500 of manufacturing an aircraft 100. Step 502 of the method 500 includes coupling a center wing structure 220 to a fuselage 102 at a wing-fuselage joint 202. As described above and shown in the figures, the center wing structure 220 defines a wing centerline 206, and has a pair of engine mounting locations 112 respectively on opposite sides of the wing centerline 206.

Step 504 of the method 500 includes coupling a pair of outer wing structures 300 respectively to opposite ends of the center wing structure 220 respectively via a pair of mid-wing joints 270. As described above, each mid-wing joint 270 is located outboard of a corresponding one of the engine mounting locations 112. In one example, coupling the outer wing structures 300 to the center wing structure 220 comprises coupling each outer wing structure 300 to the center wing structure 220 at a mid-wing joint 270 located at least two feet from the engine mounting location 112, and/or at least two feet from the strut-wing joint 360. For examples where the center wing structure 220 has a plurality of center wing ribs 238, and the outer wing structure 300 has a plurality of outer wing ribs 312, the step of coupling each outer wing structure 300 to the center wing structure 220 may include locating each mid-wing joint 270 at least one center wing bay 240 outboard of the engine mounting location 112, and/or locating each mid-wing joint 270 at least one outer wing bay 314 inboard of the strut-wing joint 360.

For the example shown in the figures in which the center wing structure 220 has a center wing front spar 224 and center wing rear spar 226, and each outer wing structure 300 has an outer wing front spar 304 and an outer wing rear spar 306, step 504 of coupling each outer wing structure 300 to the center wing structure 220 includes, coupling the outer wing front spar 304 to the center wing front spar 224, and coupling the outer wing rear spar 306 to the center wing rear spar 226. The step of coupling the outer wing rear spar 306 to the center wing rear spar 226 comprises coupling the outer wing rear spar 306 to the center wing rear spar 226, which is continuous between the center wing outboard ends 222 of the center wing structure 220. Similarly, the step of coupling the outer wing front spar 304 to the center wing front spar 224 comprises coupling the outer wing front spar 304 to the center wing front spar 224, which is also continuous between the center wing outboard ends 222.

Referring to the above-described FIGS. 18-23, the step of coupling the outer wing rear spar 306 to the center wing rear spar 226 comprises coupling, using a rear spar splice fitting 332, the outer wing rear spar 306 to the center wing rear spar 226. The step of coupling the outer wing front spar 304 to the center wing front spar 224 comprises coupling, using a front spar splice fitting 330, the outer wing front spar 304 to the center wing front spar 224. As shown in FIG. 18, the front spar splice fitting 330 and the rear spar splice fitting 332 may each be located between an outer wing rib 312 of the outer wing structure 300, and a center wing rib 238 of the center wing structure 220.

As shown in FIGS. 20-22, the step of coupling the outer wing rear spar 306 to the center wing rear spar 226 comprises placing a channel-shaped cross section of the rear spar splice fitting 332 in mating contact with the channel-shaped cross section of the center wing rear spar 226 and the outer wing rear spar 306. The step of coupling the outer wing front spar 304 to the center wing front spar 224 comprises placing a channel-shaped cross section of the front spar splice fitting 330 in mating contact with the channel-shaped cross section of the center wing front spar 224 and the outer wing front spar 304. As shown in FIGS. 20-21, the rear spar splice fitting 332 is configured to nest inside the channel-shaped cross section of the outer wing rear spar 306 and the center wing rear spar 226. Likewise, the front spar splice fitting 330 is configured to nest inside the channel-shaped cross section of the outer wing front spar 304 and center wing front spar 224. However, as indicated above, spars and the splice fittings may have any one of a variety of alternative cross-sectional shapes, and are not limited to a channel-shaped cross section.

Referring briefly to FIGS. 20-21, the step of coupling the outer wing rear spar 306 and the outer wing front spar 304 respectively to the center wing rear spar 226 and center wing front spar 224 respectively comprises installing a splice backing plate 338 against the spar web 234 of the center wing rear spar 226 and the outer wing rear spar 306, and installing a splice backing plate 338 against the spar web 234 of the center wing front spar 224 and the outer wing front spar 304. As described above, each splice backing plate 338 is located on a side of the spar web 234 opposite the splice web 334 of the spar splice fitting 330, 332. In the example shown, the spar splice fittings 330, 332 and the splice backing plate 338 may be formed of metallic material, and may be installed with mechanical fasteners. However, in other examples, the spar splice fittings 330, 332 and/or the splice backing plates 338 may be formed of non-metallic material, such as composite material, and the spar splice fittings 330, 332 and/or the splice backing plates 338 may be adhesively bonded to the spars 224, 226, 304, 306.

Referring to FIG. 24, the method further comprises coupling the outer wing upper skin panel 308 and the outer wing lower skin panel 310 of each outer wing structure 300 to the outer wing front spar 304 and the outer wing rear spar 306. In addition, the method comprises coupling the center wing upper skin panel 250 and the center wing lower skin panel 252 of the center wing structure 220 to the center wing front spar 224 and the center wing rear spar 226. As described above, the center wing upper skin panel 250 and/or the center wing lower skin panel 252 is continuous between opposing center wing outboard ends 222 of the center wing structure 220. The method may further comprise forming the center wing upper skin panel 250 and/or the center wing lower skin panel 252 of fiber-reinforced polymer matrix material having at least 3 distinct fiber orientations. As shown in the example of FIGS. 15-17, the method may further comprise forming the center wing upper skin panel 250 and/or the center wing lower skin panel 252 with integral stringers 254 (e.g., composite stringers) that are arranged in chordwise-spaced relation to each other. However, in other examples, the skin panels 250, 252, 308, 310 may be formed of metallic material, such as aluminum.

Referring still to FIG. 24, the method further includes coupling, using an upper panel splice plate 318, the outer wing upper skin panel 308 to the center wing upper skin panel 250. In addition, the method includes coupling, using a lower panel splice plate 320, the outer wing lower skin panel 310 to the center wing lower skin panel 252. In the example shown, the steps of coupling the outer wing upper skin panel 308 to the center wing upper skin panel 250, and coupling the outer wing lower skin panel 310 to the center wing lower skin panel 252 comprise coupling (i.e., splicing together) the outer wing upper skin panel 308 to the center wing upper skin panel 250 at a different spanwise location than where the outer wing lower skin panel 310 and the center wing lower skin panel 252 are coupled (i.e., spliced together). However, as mentioned above, the upper skin panels 250, 308 may be spliced together at the same spanwise location as the lower skin panels 252, 310.

In the example of FIG. 24, the step of coupling the outer wing upper skin panel 308 to the center wing upper skin panel 250 comprises installing an upper panel splice plate 318 on top of a center wing rib 238, and coupling the outer wing upper skin panel 308 and the center wing upper skin panel 250 to the upper panel splice plate 318, such that the upper panel splice plate 318 is sandwiched between the rib flange 242 on top of the center wing rib 238, and the inner surfaces of the outer wing upper skin panel 308 and the center wing upper skin panel 250. The step of coupling the outer wing lower skin panel 310 to the center wing lower skin panel 252 comprises installing a lower panel splice plate 320 on a bottom side of an outer wing rib 312, and coupling the outer wing lower skin panel 310 and the center wing lower skin panel 252 to the lower panel splice plate 320, such that the lower panel splice plate 320 is sandwiched between the rib flange 242 on the bottom of the outer wing rib 312, and the inner surfaces of the outer wing lower skin panel 310 and the center wing lower skin panel 252

Step 506 of the method 500 includes coupling a pair of struts 350 to the fuselage 102, and respectively to the pair of outer wing structures 300. In this regard, the method 500 includes coupling each strut 350 to the fuselage 102 at a strut-fuselage joint 364 located below and aft of the wing-fuselage joint 202, and coupling each strut 350 to one of the outer wing structures 300 at a strut-wing joint 360 located outboard of the mid-wing joint 270. In the example shown, the step of coupling each strut 350 to one of the outer wing structures 300 at the strut-wing joint 360 comprises coupling each strut 350 to the strut-wing joint 360 located at a distance of 40-70 percent of a wing halfspan of the wing assembly 200. However, the strut-wing joint 360 may be located at any location along the wing assembly 200, and is not limited to being located at 40-70 percent of the wing halfspan. Furthermore, although the aircraft 100 shown in the figures is configured for transonic airspeeds, the presently-disclosed wing assembly 200 may be implemented on any one of a variety of alternative aircraft configurations having strut-braced wings, including aircraft configured to operate at airspeeds below transonic.

FIG. 26 is a flowchart of operations included in a method of enhancing the performance of an aircraft 100. As described above, the aircraft 100 has a wing assembly 200 comprising a pair of outer wing structures 300 joined to a center wing structure 220 respectively at a pair of mid-wing joints 270, each of which is located outboard of an engine mounting location 112, and inboard of a strut-wing joint 360. The center wing structure 220 is coupled to the fuselage 102 at a wing-fuselage joint 202. Each outer wing structure 300 is supported by a strut 350 extending from the fuselage 102 up to the strut-wing joint 360, as described above.

Step 602 of the method 600 includes generating a lifting force 400 when air passes over the wing assembly 200. FIGS. 5-10 and 14 illustrate an example of the lifting force 400 distributed along the length of the wing assembly 200 on one side of the aircraft 100.

Step 604 of the method 600 includes generating tension load 402 in the struts 350 in response to the lifting force 400 generated by the wing assembly 200. Although not shown in the figures, a compression load would be generated in the struts 350 during a negative aircraft maneuver (i.e., a negative g-load). As mentioned above, the aft offset 366 of the strut-fuselage joint 364 (relative to the wing-fuselage joint 202) results in a relatively large vertical bending moment at the wing root 126 and at the strut root 352. As described above, the magnitude of the vertical moment ($M_{z\ wing\text{-}min}$) at the mid-wing joint 270 is lower than the magnitude of the vertical moment ($M_{z\ wing\text{-}max}$) at the wing-fuselage joint 202. As a result, the axial loads in the outer wing spars 304, 306 at the mid-wing joint 270 are correspondingly lower.

Step 606 of the method 600 includes counteracting, at each mid-wing joint 270, the vertical moment (e.g., $M_{z\ wing\text{-}max}$) induced by the tension load 402 in the struts 350 due to the lifting force 400 on the wing assembly 200. In the example shown, the reduced vertical moment ($M_{z\ wing\text{-}min}$) at the mid-wing joint 270 is reacted by tension load 402 in the outer wing front spar 304, and compression load 404 in the outer wing rear spar 306. As mentioned above, the wing assembly 200 may be provided in an alternative structural arrangement having any number of spars, and is not limited to an arrangement consisting of a front spar and a rear spar.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. An aircraft, comprising:
a fuselage;
a wing assembly, comprising a center wing structure and a pair of outer wing structures, the center wing structure is configured to be coupled to the fuselage at a wing-fuselage joint, defines a wing centerline, has a center wing front spar and a center wing rear spar, and has a pair of engine mounting locations respectively on opposite sides of the wing centerline;
a pair of struts, each configured to be coupled to the fuselage at a strut-fuselage joint, and to one of the outer wing structures at a strut-wing joint, each strut-fuselage joint is located below and aft of the wing-fuselage joint; and
each outer wing structure has an outer wing front spar and an outer wing rear spar configured to be coupled respectively to the center wing front spar and the center wing rear spar of the center wing structure at a mid-wing joint located no further inboard than the engine mounting location, and no further outboard than the strut-wing joint.

2. The aircraft of claim 1, wherein the center wing structure is configured such that each mid-wing joint is located according to at least one of the following:
each mid-wing joint is located at least two feet away from the engine mounting location; and
each mid-wing joint is located at least two feet away from the strut-wing joint.

3. The aircraft of claim 1, wherein:
the center wing structure has a pair of center wing outboard ends respectively on opposite sides of the wing centerline; and
the center wing rear spar is continuous between the center wing outboard ends.

4. The aircraft of claim 1, further comprising at least one of the following for each mid-wing joint:
a front spar splice fitting configured to couple the center wing front spar to the outer wing front spar; and
a rear spar splice fitting configured to couple the center wing rear spar to the outer wing rear spar.

5. The aircraft of claim 4, wherein:
the center wing structure has a center wing rib;
each outer wing structure has an outer wing rib; and
the center wing structure is configured such that the front spar splice fitting and the rear spar splice fitting at each mid-wing joint are located between the outer wing rib and the center wing rib.

6. The aircraft of claim 5, wherein:
each outer wing structure has an outer wing upper skin panel and an outer wing lower skin panel coupled to the outer wing ribs, the outer wing front spar, and the outer wing rear spar;
the center wing structure has a center wing upper skin panel and a center wing lower skin panel coupled to the center wing ribs, the center wing front spar, and the center wing rear spar, the center wing structure having a pair of center wing outboard ends respectively on opposite sides of the wing centerline; and at least one of the center wing upper skin panel and the center wing lower skin panel is continuous between the center wing outboard ends.

7. The aircraft of claim 6, further comprising, at each mid-wing joint, at least one of the following:

an upper panel splice plate configured to couple the outer wing upper skin panel to the center wing upper skin panel; and a lower panel splice plate configured to couple the outer wing lower skin panel to the center wing lower skin panel.

8. The aircraft of claim 6, wherein:

the center wing structure is configured such that the center wing upper skin panel and the outer wing upper skin panel are spliced together at a different spanwise location than where the outer wing lower skin panel and the center wing lower skin panel are spliced together.

9. The aircraft of claim 1, wherein the wing assembly is a swept wing.

10. The aircraft of claim 1, wherein the aircraft is configured for transonic airspeeds.

11. A method of manufacturing an aircraft, comprising:

coupling a center wing structure to a fuselage at a wing-fuselage joint, the center wing structure defines a wing centerline, has a center wing front spar and a center wing rear spar, and has a pair of engine mounting locations respectively on opposite sides of the wing centerline;

coupling an outer wing front spar and an outer wing rear spar of each of a pair of outer wing structures to one of opposite ends of the center wing front spar and the center wing rear spar of the center wing structure respectively via one of a pair of mid-wing joints, each located outboard of a corresponding one of the engine mounting locations;

coupling a pair of struts to the fuselage, and respectively to the pair of outer wing structures, by performing the following:

coupling each strut to the fuselage at a strut-fuselage joint located below and aft of the wing-fuselage joint; and coupling each strut to one of the outer wing structures at a strut-wing joint located outboard of the mid-wing joint.

12. The method of claim 11, wherein coupling the outer wing structures to the center wing structure comprises:

coupling each outer wing structure to the center wing structure at the mid-wing joint, located according to at least one of the following:

each mid-wing joint is located at least two feet from the engine mounting location; and each mid-wing joint is located at least two feet from the strut-wing joint.

13. The method of claim 11, wherein coupling the outer wing rear spar of each outer wing structure to the center wing rear spar of the center wing structure comprises:

coupling each outer wing structure to the center wing rear spar that is continuous between center wing outboard ends on opposite sides of the wing centerline.

14. The method of claim 11, wherein coupling the outer wing rear spar and the outer wing front spar respectively to the center wing rear spar and center wing front spar respectively comprises:

coupling, using a rear spar splice fitting, the center wing rear spar to the outer wing rear spar; and coupling, using a front spar splice fitting, the center wing front spar to the outer wing front spar.

15. The method of claim 11, further comprising:

coupling a center wing upper skin panel and a center wing lower skin panel of the center wing structure to the center wing front spar and the center wing rear spar; and wherein at least one of the center wing upper skin panel and the center wing lower skin panel is continuous between opposing center wing outboard ends of the center wing structure.

16. The method of claim 15, further comprising, at each mid-wing joint, at least one of the following:

coupling, using an upper panel splice plate, an outer wing upper skin panel to the center wing upper skin panel; and coupling, using a lower panel splice plate, an outer wing lower skin panel to the center wing lower skin panel.

17. The method of claim 16, wherein coupling the outer wing upper skin panel to the center wing upper skin panel, and coupling the outer wing lower skin panel to the center wing lower skin panel comprise:

coupling the outer wing upper skin panel to the center wing upper skin panel at a different spanwise location than where the outer wing lower skin panel and the center wing lower skin panel are coupled.

18. A method of enhancing the performance of an aircraft, comprising:

generating a lifting force when air passes over a wing assembly, the wing assembly comprises:

a center wing structure, coupled to a fuselage at a wing-fuselage joint, and having a wing centerline, a center wing front spar and a center wing rear spar, and a pair of engine mounting locations respectively on opposite sides of the wing centerline;

a pair of outer wing structures, each having an outer wing front spar and an outer wing rear spar coupled to one of opposite ends respectively of the center wing front spar and the center wing rear spar of the center wing structure via one of a pair of mid-wing joints, each mid-wing joint located outboard of a corresponding one of the engine mounting locations, the outer wing structures are respectively supported by a pair of struts, each coupled to the fuselage at a strut-fuselage joint, and coupled to one of the outer wing structures at a strut-wing joint, each strut-fuselage joint is located below and aft of the wing-fuselage joint;

generating tension load in the struts due to the lifting force; and counteracting, at each mid-wing joint, a vertical moment induced by the tension load in the struts.

19. The method of claim 18, wherein the center wing structure is configured such that each mid-wing joint is located according to at least one of the following:

each mid-wing joint is located at least two feet away from the engine mounting location; and each mid-wing joint is located at least two feet away from the strut-wing joint.

20. The method of claim 18, wherein:

the center wing structure has a pair of center wing outboard ends respectively on opposite sides of the wing centerline; and the center wing rear spar is continuous between the center wing outboard ends.

* * * * *